(12) United States Patent
Kurata et al.

(10) Patent No.: US 9,127,978 B2
(45) Date of Patent: Sep. 8, 2015

(54) MEASUREMENT SYSTEM AND MEASUREMENT METHOD OF FLUCTUATIONS IN WEIGHT OF RESPECTIVE DIVIDED BODY PARTS, AND UTILIZATION SYSTEM AND UTILIZATION METHOD THEREOF

(76) Inventors: Tadao Kurata, Nerima-ku (JP); Sumiko Kurata, Nerima-ku (JP); Noriko Kurata, Nerima-ku (JP)

( * ) Notice: Subject to any disclaimer, the term of this patent is extended or adjusted under 35 U.S.C. 154(b) by 608 days.

(21) Appl. No.: 13/519,628

(22) PCT Filed: Dec. 16, 2010

(86) PCT No.: PCT/JP2010/072677
§ 371 (c)(1),
(2), (4) Date: Sep. 14, 2012

(87) PCT Pub. No.: WO2011/081030
PCT Pub. Date: Jul. 7, 2011

(65) Prior Publication Data
US 2012/0330610 A1      Dec. 27, 2012

(30) Foreign Application Priority Data

Dec. 28, 2009 (JP) .................................. 2009-296615

(51) Int. Cl.
*G01G 19/44* (2006.01)
*G01G 23/01* (2006.01)

(52) U.S. Cl.
CPC .............. *G01G 19/445* (2013.01); *G01G 23/01* (2013.01)

(58) Field of Classification Search
CPC ..... G01G 19/445; G01G 19/44; G01G 23/01; G01G 23/012
See application file for complete search history.

(56) References Cited

U.S. PATENT DOCUMENTS

| 4,379,495 A * | 4/1983 | Cocks et al. ...................... 177/1 |
| 7,596,453 B2 * | 9/2009 | Sakai ............................... 702/23 |
| 2009/0229889 A1 * | 9/2009 | Lin et al. .................... 177/25.18 |

FOREIGN PATENT DOCUMENTS

| EP | 1985978 A1 * | 10/2008 |
| JP | 2003-000552 A | 1/2003 |
| JP | 2007-040908 A | 2/2007 |
| JP | 4290704 B | 4/2009 |

* cited by examiner

*Primary Examiner* — Timothy H Hwang
(74) *Attorney, Agent, or Firm* — Berenato & White, LLC

(57) ABSTRACT

A system for rapidly and precisely measuring and recording changes and fluctuations in weight of respective divided body parts occurred from moment to moment in a given position is provided. In the system, divided body part weighing units for separately weighing all body parts and a measurement controlling and data processing unit for controlling the weighing units and for receiving the measured data from the weighing units and are connected so as to be freely transmittable.

2 Claims, 22 Drawing Sheets

| Measurement Number | Time | Head | Right Arm | Left Arm | Breast | Abdomen | Right Leg | Left Leg | Total Weight of Body | Weight Difference |
|---|---|---|---|---|---|---|---|---|---|---|
| 1 | 12:12:55 | 3.842 | 1.364 | 1.322 | 12.052 | 20.592 | 4.072 | 4.030 | 47.262 | -0.002 |
| 2 | 12:12:55 | 3.842 | 1.362 | 1.322 | 12.016 | 20.626 | 4.070 | 4.030 | 47.276 | 0.004 |
| 3 | 12:12:55 | 3.854 | 1.362 | 1.320 | 11.962 | 20.668 | 4.064 | 4.038 | 47.268 | 0.012 |
| 4 | 12:12:55 | 3.878 | 1.362 | 1.320 | 11.894 | 20.730 | 4.056 | 4.028 | 47.268 | 0.012 |
| 5 | 12:12:55 | 3.888 | 1.362 | 1.320 | 11.852 | 20.766 | 4.056 | 4.028 | 47.272 | 0.008 |
| 6 | 12:12:55 | 3.886 | 1.362 | 1.320 | 11.840 | 20.790 | 4.056 | 4.026 | 47.280 | 0.000 |
| 7 | 12:12:55 | 3.886 | 1.362 | 1.320 | 11.830 | 20.792 | 4.054 | 4.026 | 47.270 | -0.010 |
| 8 | 12:12:55 | 3.884 | 1.362 | 1.320 | 11.862 | 20.770 | 4.054 | 4.026 | 47.278 | 0.002 |
| 9 | 12:12:55 | 3.884 | 1.370 | 1.320 | 11.920 | 20.722 | 4.056 | 4.026 | 47.298 | -0.018 |
| 10 | 12:12:55 | 3.884 | 1.370 | 1.320 | 11.972 | 20.660 | 4.066 | 4.038 | 47.310 | -0.030 |
| 11 | 12:12:56 | 3.876 | 1.370 | 1.320 | 12.012 | 20.602 | 4.068 | 4.040 | 47.288 | -0.008 |
| 12 | 12:12:56 | 3.874 | 1.370 | 1.320 | 12.050 | 20.568 | 4.068 | 4.040 | 47.290 | -0.010 |
| 13 | 12:12:56 | 3.874 | 1.372 | 1.322 | 12.088 | 20.526 | 4.068 | 4.040 | 47.290 | -0.010 |
| 14 | 12:12:56 | 3.872 | 1.372 | 1.322 | 12.128 | 20.486 | 4.070 | 4.042 | 47.292 | -0.012 |
| 15 | 12:12:56 | 3.862 | 1.372 | 1.328 | 12.166 | 20.448 | 4.070 | 4.042 | 47.288 | -0.008 |
| 16 | 12:12:56 | 3.860 | 1.372 | 1.328 | 12.184 | 20.414 | 4.078 | 4.042 | 47.278 | 0.002 |
| 17 | 12:12:56 | 3.858 | 1.374 | 1.330 | 12.216 | 20.394 | 4.078 | 4.050 | 47.300 | -0.020 |
| 18 | 12:12:56 | 3.858 | 1.374 | 1.330 | 12.244 | 20.358 | 4.080 | 4.052 | 47.296 | -0.016 |
| 19 | 12:12:56 | 3.858 | 1.374 | 1.330 | 12.262 | 20.328 | 4.086 | 4.058 | 47.296 | -0.016 |
| 20 | 12:12:56 | 3.850 | 1.374 | 1.330 | 12.264 | 20.312 | 4.086 | 4.058 | 47.274 | 0.006 |
| 21 | 12:12:57 | 3.850 | 1.374 | 1.332 | 12.272 | 20.314 | 4.086 | 4.058 | 47.286 | -0.006 |
| 22 | 12:12:57 | 3.850 | 1.374 | 1.332 | 12.264 | 20.326 | 4.084 | 4.058 | 47.286 | -0.006 |
| 23 | 12:12:57 | 3.842 | 1.376 | 1.332 | 12.242 | 20.352 | 4.084 | 4.058 | 47.284 | -0.004 |
| 24 | 12:12:57 | 3.828 | 1.376 | 1.332 | 12.234 | 20.388 | 4.082 | 4.050 | 47.288 | -0.008 |
| 25 | 12:12:57 | 3.810 | 1.376 | 1.332 | 12.218 | 20.420 | 4.074 | 4.048 | 47.278 | 0.002 |
| 556 | 12:13:50 | 3.894 | 1.428 | 1.408 | 11.848 | 20.578 | 4.056 | 4.044 | 47.256 | 0.024 |
| 557 | 12:13:50 | 3.902 | 1.426 | 1.408 | 11.828 | 20.608 | 4.056 | 4.042 | 47.270 | 0.010 |
| 558 | 12:13:50 | 3.898 | 1.426 | 1.408 | 11.796 | 20.630 | 4.056 | 4.042 | 47.256 | 0.024 |
| 559 | 12:13:50 | 3.898 | 1.426 | 1.408 | 11.762 | 20.658 | 4.054 | 4.042 | 47.248 | 0.032 |
| 560 | 12:13:50 | 3.898 | 1.426 | 1.408 | 11.744 | 20.694 | 4.048 | 4.040 | 47.258 | 0.022 |
| 561 | 12:13:51 | 3.898 | 1.418 | 1.406 | 11.732 | 20.730 | 4.046 | 4.032 | 47.282 | 0.018 |
| 562 | 12:13:51 | 3.898 | 1.418 | 1.406 | 11.756 | 20.746 | 4.046 | 4.032 | 47.302 | -0.022 |
| 563 | 12:13:51 | 3.898 | 1.418 | 1.406 | 11.810 | 20.726 | 4.046 | 4.032 | 47.336 | -0.056 |
| 564 | 12:13:51 | 3.898 | 1.420 | 1.406 | 11.876 | 20.684 | 4.048 | 4.034 | 47.366 | -0.086 |
| 565 | 12:13:51 | 3.898 | 1.420 | 1.404 | 11.962 | 20.612 | 4.054 | 4.040 | 47.390 | -0.110 |
| 566 | 12:13:51 | 3.898 | 1.420 | 1.404 | 12.022 | 20.538 | 4.056 | 4.042 | 47.380 | -0.100 |
| 567 | 12:13:51 | 3.888 | 1.422 | 1.404 | 12.060 | 20.464 | 4.066 | 4.052 | 47.356 | -0.076 |
| 568 | 12:13:51 | 3.886 | 1.422 | 1.404 | 12.086 | 20.400 | 4.068 | 4.054 | 47.320 | -0.040 |
| 569 | 12:13:51 | 3.884 | 1.430 | 1.406 | 12.120 | 20.364 | 4.068 | 4.056 | 47.328 | -0.048 |
| 570 | 12:13:51 | 3.884 | 1.430 | 1.406 | 12.150 | 20.332 | 4.070 | 4.056 | 47.328 | -0.048 |
| 571 | 12:13:52 | 3.882 | 1.432 | 1.406 | 12.176 | 20.296 | 4.070 | 4.058 | 47.320 | -0.040 |
| 572 | 12:13:52 | 3.876 | 1.432 | 1.406 | 12.198 | 20.266 | 4.070 | 4.058 | 47.306 | -0.026 |
| 573 | 12:13:52 | 3.876 | 1.432 | 1.406 | 12.200 | 20.240 | 4.072 | 4.058 | 47.284 | -0.004 |
| 574 | 12:13:52 | 3.874 | 1.434 | 1.406 | 12.218 | 20.222 | 4.072 | 4.060 | 47.286 | -0.006 |
| 575 | 12:13:52 | 3.874 | 1.434 | 1.412 | 12.240 | 20.212 | 4.072 | 4.066 | 47.310 | -0.030 |
| 576 | 12:13:52 | 3.874 | 1.434 | 1.414 | 12.254 | 20.188 | 4.080 | 4.068 | 47.312 | -0.032 |
| 577 | 12:13:52 | 3.874 | 1.436 | 1.414 | 12.254 | 20.162 | 4.082 | 4.074 | 47.296 | -0.016 |
| 578 | 12:13:52 | 3.872 | 1.436 | 1.414 | 12.262 | 20.146 | 4.082 | 4.074 | 47.286 | -0.006 |
| 579 | 12:13:52 | 3.866 | 1.436 | 1.416 | 12.262 | 20.148 | 4.082 | 4.072 | 47.282 | -0.002 |
| 580 | 12:13:52 | 3.866 | 1.436 | 1.416 | 12.262 | 20.148 | 4.082 | 4.072 | 47.282 | -0.002 |
| Average | | 3.883 | 1.404 | 1.370 | 12.021 | 20.486 | 4.075 | 4.047 | 47.285 | -0.005 |

MEASUREMENT SYSTEM AND MEASUREMENT METHOD OF FLUCTUATIONS IN WEIGHT OF RESPECTIVE DIVIDED BODY PARTS, AND UTILIZATION SYSTEM AND UTILIZATION METHOD THEREOF

CROSS-REFERENCE TO RELATED APPLICATIONS AND CLAIM TO PRIORITY

This application is a National Phase of International Application No. PCT/JP2010/072677 filed Dec. 16, 2010 and relates to Japanese Patent Application No. 2009-296615 filed Dec. 28, 2009, of which the disclosures are incorporated herein by reference and to which priority is claimed.

FIELD OF THE INVENTION

The present invention relates to a measurement system and a measurement method of fluctuations in weight of respective divided body parts, and a utilization system and a utilization method thereof, which serve to understand, maintain, and enhance health conditions such as physiology, metabolism, nutriture of a subject by rapidly and precisely measuring, recording and analyzing weight changes (fluctuations) from moment to moment in a specified "body region (s)", "portion (s) of body region", or "body parts" within a very short time (e.g. by the second or less) to a long time (e.g. by the minute or by the time or more) if necessary in a given body position (e.g. face-up position).

BACKGROUND OF THE INVENTION

Weighing a body is very important in health assessment of humans. Generally, a total body weight has been measured in a standing position by using a scale, and as a premise, measured values for normal adults have been considered to remain unchanged within a given period of time except fluctuations caused by ingestion of food or drink. That is, it has been a conventional wisdom that a body weight represents a total body weight in a standing position and that its measured value is essentially static.

DESCRIPTION OF THE RELATED ART

From the view point of disease prevention of lifestyle-related disease, obesity control is important. For the purpose of it, obtaining information on body weight as well as body fat quantity, particularly, visceral fat quantity concentrating in the trunk is indispensable. In addition to the trunk, in order to prevent osteoporosis common in the elderly, it is necessary to be aware of the weight of upper and lower extremities that reflects bone density or bone quantity of both extremities. In this way, it is very important to be aware of the entire body weight as well as the weight of respective body regions for maintenance and enhancement of human health. In order to achieve this objective, Japanese Patent No. 4290704 (Patent Literature 1) by the same applicant as a current related art discloses the invention wherein weight measurement of such as the head, trunk, upper extremities, or lower extremities of a subject at a certain point can be made to an accuracy with margin of plus or minus 50 g.

Even in the invention of the related art, however, the weight of respective body regions is considered to be static and remain almost unchanged within a given period of time as a premise. In this sense, a basic notion about weight of body and body region of a human has not changed from the traditional concept even in this current related art of body-region separately weighing system.

RELATED ART LITERATURE

Patent Literature

Patent Literature 1: Japanese Patent No. 4290704

SUMMARY OF THE INVENTION

Technical Problem

In view of the foregoing present situation, it is an objective of the present invention to provide a measurement system and a measurement method of fluctuations in weight of respective divided body parts, a utilization system and a utilization method thereof for measuring, recording and analyzing, rapidly, precisely, and particularly, weight changes or fluctuations from moment to moment in a specified body region, portion of body region, or body part caused by kinetic condition inside the body such as blood stream in a face-up position or any other position. This is achieved by using various art used in conventional methods of weighing a body and the art in Patent Literature 1 and by further adopting new art from a new perspective, which was not in conventional art, that is, being theoretically possible to measure weight fluctuations caused by transfer of substance or the like when lying though it is difficult to measure when standing, and being theoretically possible to measure weight fluctuations in respective body parts by dividing the total body weight into the "n" number of parts ("n" is the number variable) by means of holding the body with the "n" number of supporting points.

Solution to Problem

For solving the foregoing problem, the present invention provides the following constitutions. A measurement system of fluctuations in weight of respective divided body parts according to a first aspect of the present invention: includes a plurality of divided body part weighing units for separately weighing all body parts divided from a whole body in a face-up position or in any other given position and a measurement controlling and data processing unit, which is connected with the weighing units so as to be freely transmittable, for controlling the weighing units and for processing the measured data of partial weight of body received from the weighing units: wherein the weighing units have means for continuously weighing body parts at regular intervals controlled by the controlling and processing unit and for transmitting the measured data of partial weight of body to the controlling and processing unit: and wherein the controlling and processing unit has means for; receiving the measured data of partial weight of body from the weighing units; storing the received data in a memory in association with a measurement time by respective body part; calculating the average total weight of body from all of total weight of body within a specified period of time by using all of the measured data of all body parts within the specified period of time stored in the memory; calculating a difference between the total weight of body in a standing position measured before and after the specified period of time or their average and the average total weight of body; determining if the difference does not exceed a pre-defined value; when not exceeding the value, defining fluctuations indicated in the measured data of partial weight of body within the specified period of time as fluctuations in respective partial weight of body, defining weight indicated in the measured data of partial weight of body as respective partial weight of body, defining an average of fluctuations within the specified period of time as respective average partial weight of body, and storing in the memory the defined respective partial weight of body and respective average partial weight of body; and extracting the defined respective partial weight of body from the memory and outputting the extracted respective partial weight of body separately in order of measurement time.

A measurement system of fluctuations in weight of respective divided body parts according to a second aspect, which is in the first aspect, is characterized in that the body part is any of six body regions, the head, right arm, left arm, trunk, right leg, and left leg, and in that the weighing units are so constituted as to separately measure the weight of all of six body regions.

A measurement system of fluctuations in weight of respective divided body parts according to a third aspect: includes a plurality of divided body parts weighing units for separately weighing all of six body regions, the head, right arm, left arm, trunk, right leg, and left leg, divided from the whole body in a face-up position or in any other given position; a plurality of divided body parts weighing units for separately weighing portions of the body region; and a measurement controlling and data processing unit, which is connected with the both units so as to be freely transmittable, for controlling the both units and for processing the measured data of weight of body region and portion of body region received from the both units: wherein the weighing units have means for continuously weighing the body regions at regular intervals controlled by the controlling and processing unit and for transmitting the measured data of weight of body regions to the controlling and processing unit: wherein the controlling and processing unit has means for; receiving the measured data of regional weight of body from the weighing units; storing in a memory the received data of regional weight of body in association with a measurement time by respective body region; calculating the average total weight of body from all of total weight of body within a specified period of time by using all of the measured data of all body regions within the specified period of time stored in the memory; calculating the difference between the total weight of body in a standing position measured before and after the measurement time or their average and the average total weight of body; determining if the difference does not exceed a predefined value; when not exceeding the value, defining fluctuations indicated in the measured data of regional weight of body within the specified period of time as fluctuations in respective regional weight of body, defining the weight indicated in the measured data of regional weight of body as respective regional weight of body, defining the average in fluctuations within the specified period of time as respective average regional weight of body, and storing in the memory the defined respective regional weight of body and respective average regional weight of body: wherein the weighing units have means for continuously weighing portions of body region at regular intervals controlled by the controlling and processing unit and for transmitting the measured data of weight of portion of body regions to the controlling and processing unit: wherein the controlling and processing unit has means for; receiving the measured data of portioned regional weight of body from the weighing units; storing in a memory the received data of portioned weight of body region in association with a measurement time by respective portions of body region; calculating the average specified regional weight of body from all of the specified regional weight of body within the specified period of time by using all of the measured data of portions of specified body region within the specified period of time stored in the memory; calculating the difference between the average specified regional weight of body and its corresponding average regional weight of body previously defined; determining if the difference does not exceed a predefined value; when not exceeding the value, defining fluctuations indicated in the measured data of portioned weight of body region within the specified period of time as fluctuations in respective portioned weight of body region, defining the weight indicated in the measured data of portioned weight of body region as respective portioned weight of body region, defining the average in fluctuations within the specified period of time as respective average portioned weight of body region, and storing in the memory the defined respective portioned weight of body region and respective average portioned weight of body region; and extracting the defined respective portioned weight of body region from the memory and outputting the extracted respective portioned weight of body region separately in order of measurement time.

A utilization system of the measurement system of fluctuations in weight of respective divided body parts according to a fourth aspect is so constituted that the measurement system described in any one of the first to third aspects is combined with various medical or medical-related diagnoses and therapeutic devices including a diagnostic imaging system, or is incorporated in a health check table, an examination table, or an operating table, and the data of weight or the data of fluctuations in weight defined through the measurement system is output as a part of related data being helpful to various health check, medical examinations, diagnoses, operations.

A measurement method of fluctuations in weight of respective divided body parts according to a fifth aspect: includes a plurality of divided body parts weighing units for separately weighing all of body parts divided from the whole body in a face-up position or in any other given position and a measurement controlling and data processing unit, which is connected with the weighing units so as to be freely transmittable, for controlling the weighing units and for processing the measured data of partial weight of body received from the weighing units: wherein the weighing units execute steps for continuously weighing body parts at regular intervals controlled by the controlling and processing unit and for transmitting the measured data of partial weight of body to the controlling and processing unit: and wherein the controlling and processing unit executes steps for; receiving the measured data of partial weight of body from the weighing units; storing the received data in a memory in association with a measurement time by respective body part; calculating an average total weight of body from all of total weight of body within a specified period of time by using all of the measured data of all body parts within the specified period of time stored in the memory; calculating the difference between the total weight of body in a standing position measured before and after the measurement time or their average and the average total weight of body; determining if the difference does not exceed a predefined value; when not exceeding the value, defining fluctuations indicated in the measured data of partial weight of body within the specified period of time as fluctuations in respective partial weight of body, defining the weight indicated in the measured data of partial weight of body as respective partial weight of body, defining the average in fluctuations within the specified period of time as respective average partial weight of body, and storing in the memory the defined respective partial weight of body and respective average partial weight of body; and extracting the defined respective partial weight of body from the memory and outputting the extracted respective partial weight of body separately in order of measurement time.

A measurement method of fluctuations in weight of respective divided body parts according to a sixth aspect, which is in the first aspect, is characterized in that the partial body is any of six body regions, the head, right arm, left arm, trunk, right leg, and left leg, and in that the weighing units is so constituted as to separately weigh all of six body regions.

A measurement method of fluctuations in weight of respective divided body according to a seventh aspect: includes a plurality of divided body parts weighing units for separately weighing all of six body regions, the head, right arm, left arm, trunk, right leg, and left leg, in a face-up position or in any other given position; a plurality of divided body parts weighing units for separately weighing portions of the body region; and a measurement controlling and data processing unit, which is connected with the both units so as to be freely transmittable, for controlling the both units and for processing the measured data of weight of body region and portion of body region received from the both units: wherein the weighing units execute steps for continuously weighing the body regions at regular intervals controlled by the controlling and processing unit and for transmitting the measured data of weight of body regions to the controlling and processing unit: wherein the controlling and processing unit executes steps for; receiving the measured data of regional weight of body from the weighing units; storing in a memory the received data of regional weight of body in association with a measurement time by respective body region; calculating an average total weight of body from all of total weight of body within a specified period of time by using all of the measured data of all body regions within the specified period of time stored in the memory; calculating the difference between the total weight of body in a standing position measured before and after the measurement time or their average and the average total weight of body; determining if the difference does not exceed a predefined value; when not exceeding the value, defining fluctuations indicated in the measured data of regional weight of body within the specified period of time as fluctuations in respective regional weight of body, defining the weight indicated in the measured data of regional weight of body as respective regional weight of body, defining the average in fluctuations within the specified period of time as respective average regional weight of body, and storing in the memory the defined respective regional weight of body and respective average regional weight of body: wherein the weighing units execute steps for continuously weighing portions of body region at regular intervals controlled by the controlling and processing unit and for transmitting the measured data of portioned weight of body region to the controlling and processing unit: wherein the controlling and processing unit executes steps for; receiving the measured data of portioned weight of body region from the weighing units; storing in a memory the received data of portioned weight of body region in association with a measurement time by respective portions of body region; calculating the average specified regional weight of body from all of the specified regional weight of body within a specified period of time by using the all of the measured data of portions of specified body region within the specified period of time stored in the memory; calculating the difference between the average specified regional weight of body and its corresponding average regional weight of body previously defined; determining if the difference does not exceed a predefined value; when not exceeding the value, defining fluctuations indicated in the measured data of portioned weight of body region within the specified period of time as fluctuations in respective portioned weight of body region, defining the weight indicated in the measured data of portioned weight of body region as respective portioned weight of body region, defining the average in fluctuations within the specified period of time as respective average portioned weight of body region, and storing in the memory the defined respective portioned weight of body region and respective average portioned weight of body region; and extracting the defined respective portioned weight of body region from the memory and outputting the extracted respective portioned weight of body region separately in order of measurement time.

A utilization method of the measurement method according to an eighth aspect is so constituted that the measurement method described in any one of the fifth to seventh aspects is combined with methods of measurement and analysis used in various medical or medical-related diagnoses and therapeutic devices including a diagnostic imaging system, or is performed in a health check table, an examination table, or an operating table, and the data of weight or the data of fluctuations in weight defined through the measurement system is output as a part of related data being helpful to various health check, medical examinations, diagnoses, operations.

Advantageous Effects of the Invention

The present invention clarifies for the first time changes and fluctuations in weight of body caused by transfer, or the like, of various substances such as blood, which is at work constantly in a body and vital to life support. This is achieved by precisely and closely measuring, recoding, and analyzing fluctuations from moment to moment in weight in divided body parts, which has been conventionally unknown. The present invention makes it possible to obtain information that is helpful to assess, maintain, and enhance people's health and will greatly contribute to progress and growth of current medical equipments or to development in new medical and health equipments.

For example, when transfer of substance internally and externally in a subject is not apparently recognized, analyzing the measured data alone or in combination with another data measured by various medical equipment makes it possible to understand physiology, metabolism, nutriture in the subject's body and to obtain information that is helpful to maintain and enhance the subject's health.

When transfer of substance internally and externally in a subject apparently is recognized, the present invention is used to optimize a process of the intended transfer of the substance. For example, optimization of a process of transfer, treatment or operation of substances such as blood during dialysis may be achieved, leading to obtaining information that is helpful to understand physiology, metabolism, nutriture in the subject's body and helpful to maintain and enhance the subject's health.

Further, incorporation of the present system entirely or partly into an operation table allows its utilization in optimizing various process control during surgical operation, or its incorporation into an examination table allows obtaining effective data in examining, leading to obtaining information that is helpful to understand physiology, metabolism, nutriture in the subject's body and helpful to maintain and enhance the subject's health.

BRIEF DESCRIPTION OF THE DRAWINGS

FIG. 5 is a table showing results measured with the measurement system according to embodiment 1 in the present invention.

DETAILED DESCRIPTION OF THE PREFERRED EMBODIMENTS

Reference is now made to embodiments of the present invention with reference to the attached drawings. The measurement controlling and data processing unit and the divided body part weighing units are a computer equipped with a CPU and foregoing each step is executed by CPU's read-in of the necessary data. The same should apply to the controlling and processing unit to be described hereinafter.

Figure 1:
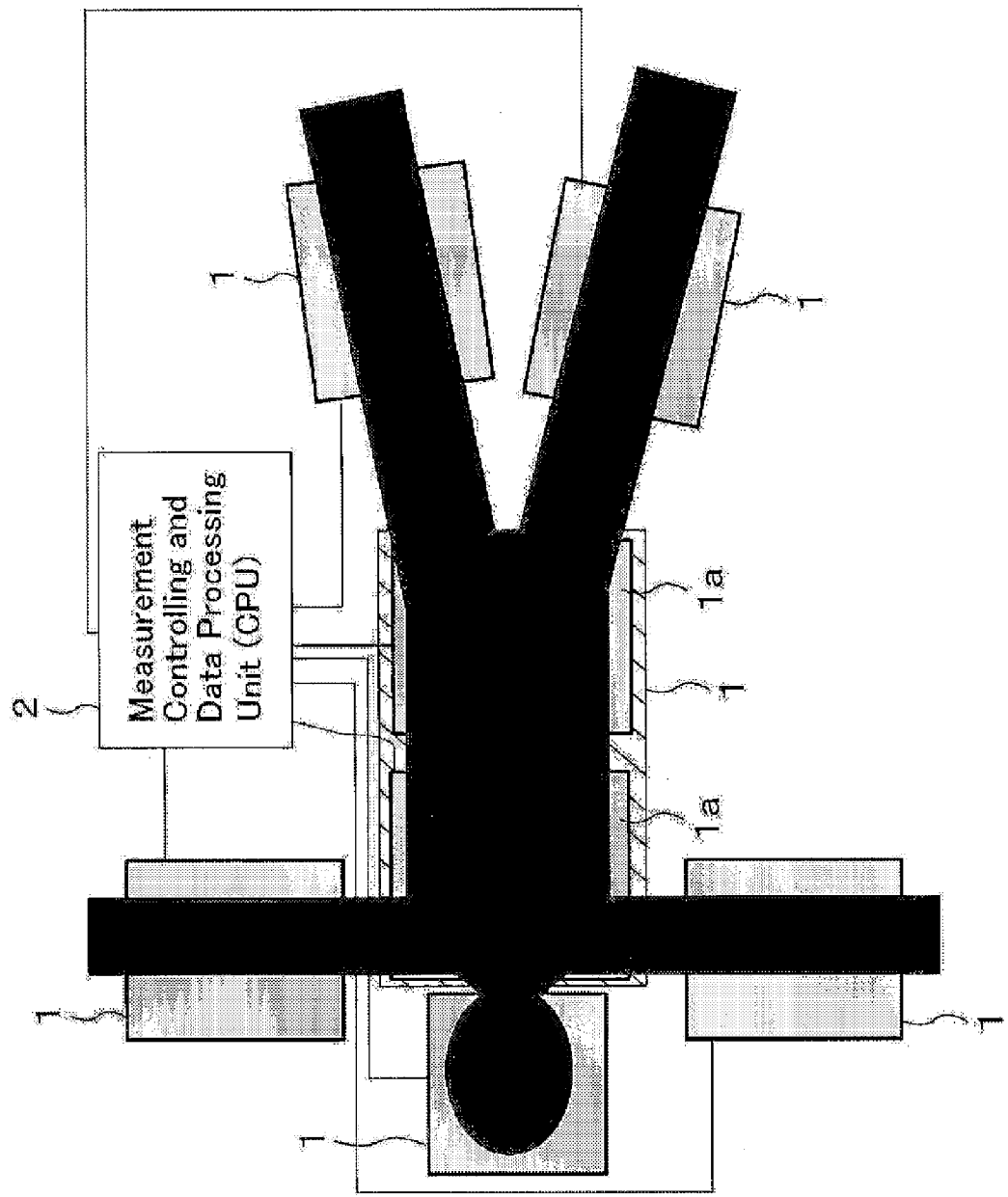
FIG. 1 is a schematic top view showing the entire figuration of a measurement system of fluctuations in weight of respective divided body parts according to the present invention.

FIG. 1 is a schematic top view showing one of examples of the entire figuration of the measurement system according to the present invention. In this example, a body in a face-up position is divided into six body regions, the head, right arm, left arm, trunk, right leg, and left leg, in a general manner. Further, the trunk, which is considered to be most vital in health assessment, is divided into two portions, the upper trunk (breast) and the lower trunk (abdomen).

That is, the weight of the trunk (body region) is divided into two portions, the weight of breast and that of abdomen. FIG. 1 illustrates an example of measuring fluctuations in respective weight when the body is divided into seven body parts (five body regions and two portions of body region), which includes seven weighing units 1 and 1a (reference numeral 1 denotes a weighing unit for weighing body region: reference numeral 1a denotes a weighing unit for weighing portion of body region or body part other than body region: both units have the same function) and one controlling and processing unit 2 (computer for measurement controlling, data processing and analyzing). In the present invention, it is preferable to measure fluctuations in weight of respective divided body parts in a face-up position; however, measurement may be made in any other positions without limiting to the face-up position.

Using the weighing units 1 and 1a in a shape appropriate to respective portions of body region enables separate measurement of fluctuations in weight of respective portions of body region even though respective body regions are apparently integrated as one portion. Further, it is logically and practically possible to almost simultaneously measure fluctuations in weight of respective body parts arbitrarily divided irrespective of apparently integrated body region.

In the present invention, "a body region" represents functionally divided body region including the head, right arm, left arm, trunk, right leg, and left leg, which are generally divisible. "A portion of body region" represents further divided body region arbitrarily or functionally. "A body part" represents arbitrarily divided body part without regarding to the body region or the portion of body region including the body region and the portion of body region. That is, the body part includes the body region, the portion of body region and the arbitrarily divided body part without regarding to the body region or the portion of body region. The collective term for the body region, portion of body region, and body part is referred to as the "divided body parts".

Figure 2:
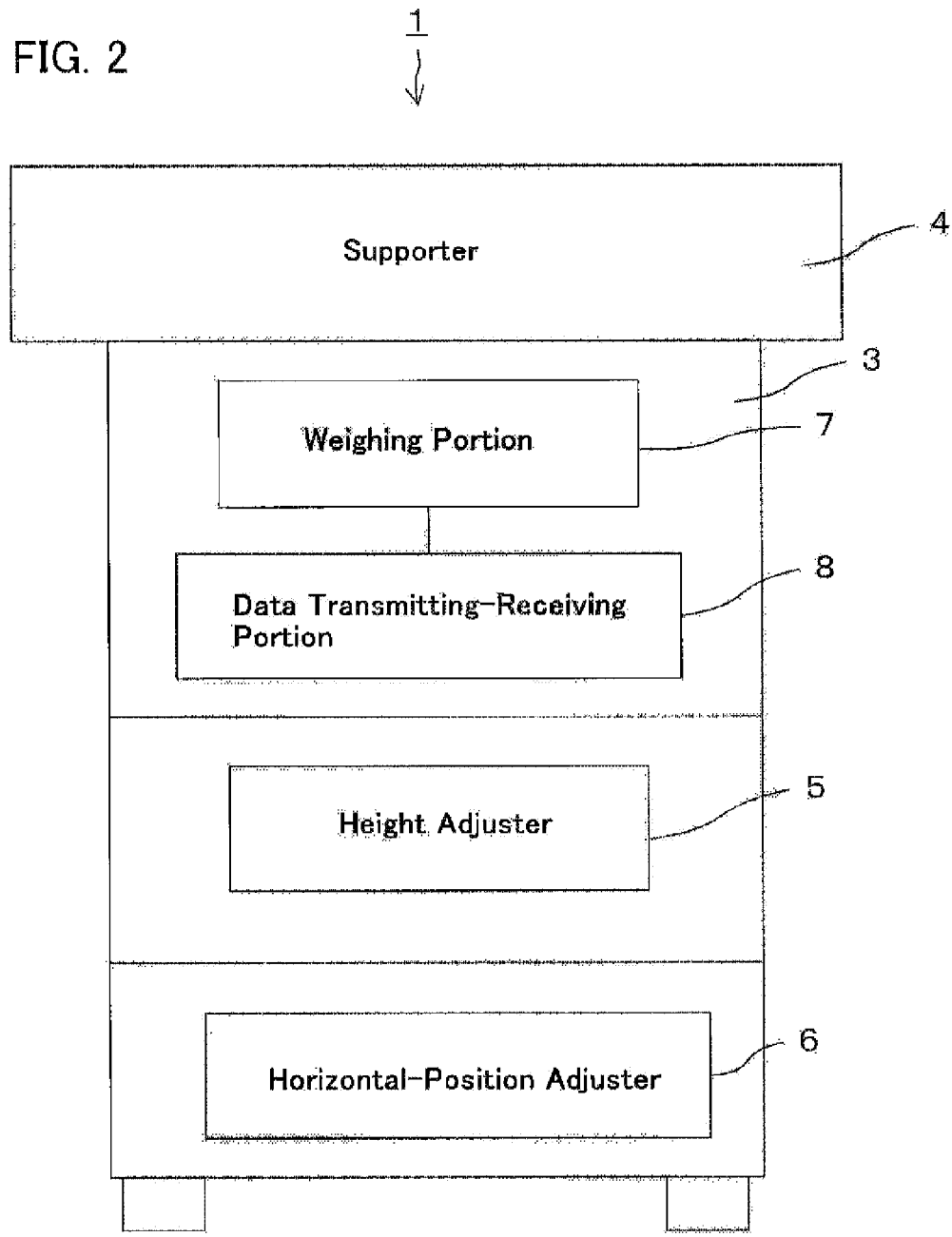
FIG. 2 is an explanatory diagram showing a divided body part weighing unit according to the present invention.

FIG. 2 illustrates one of examples of the weighing unit 1. The weighing unit 1 includes a main body 3 and a supporter 4. The main body 3 is accordingly provided with a height adjuster 5 and a horizontal-position adjuster 6. A weighing portion 7 and a data transmitting-receiving portion 8 are provided in a prescribed manner inside the main body 3. The weighing unit 1*a* has the same function.

Embodiment 1

Reference is now made to the measurement system in embodiment 1 of the present invention, wherein after weighing respective body parts, fluctuations in respective partial weight of body and respective partial weight of body are defined. In the measurement system, as illustrated in FIG. 1, a plurality of weighing units 1 and 1*a* for separately weighing all of body parts divided from the whole body in a face-up position or in any other position and a measurement controlling and data processing unit 2 for controlling the weighing units 1 and 1*a* and for processing the measured data of partial weight of body received from the weighing units 1 and 1*a* are connected so as to be freely transmittable. The body parts divided from the whole body includes the body region, such as the head, the right arm, the left arm, the trunk, the right leg, and the left leg, the portion of body region divided from the body region, and the body part arbitrary divided from the whole body without regarding to the body region and the portion of body region.

In FIG. 1, the whole body is divided into five body regions (head, right arm, left arm, right leg, and left leg) and two portions of body region (breast and abdomen). Thus, since weighing units 1 is for weighing five body regions and weighing unit 1*a* is for weighing two portions of body region, one of the weighing units 1 for weighing the trunk shown in FIG. 1 is not used when applied in FIG. 1. The weighing units 1*a* may be provided to weigh any other body region, portion of body region, or body part without limiting to the two portions of body region.

Figure 3:
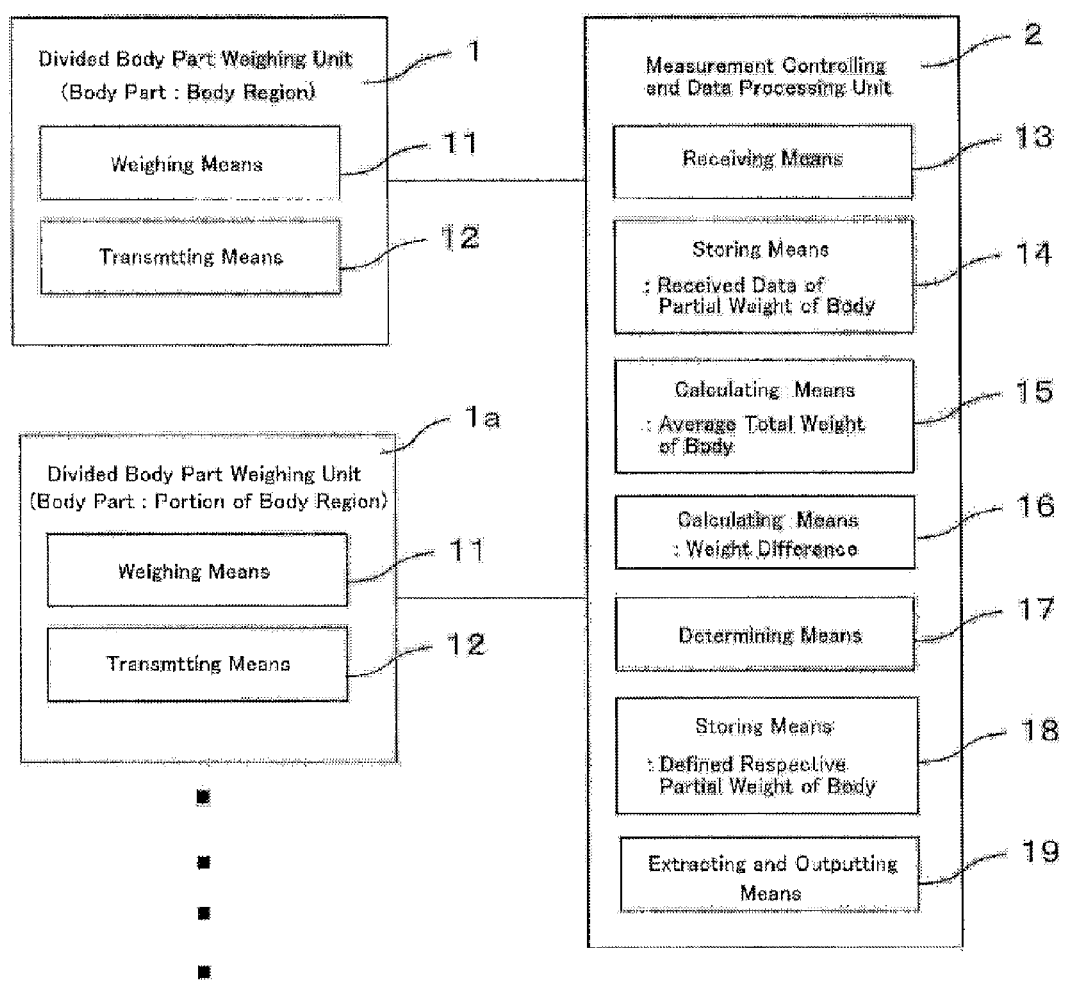
FIG. 3 is a functional chart showing the measurement system according to embodiment 1 in the present invention.

As shown in FIG. 3, the weighing units 1 and 1*a*, respectively, have a weighing means 11 (corresponding to weighing portion 7) for continuously weighing a body part at regular intervals controlled by the controlling and processing unit 2 and a transmitting means 12 (corresponding to data transmitting-receiving portion 8) for transmitting the measured data of partial weight of body to the controlling and processing unit 2.

The controlling and processing unit 2 has a receiving means 13 for receiving the measured data of partial weight of body from the units 1 and 1*a*, a storing means 14 for storing the received data of partial weight of body in a memory in association with a measurement time (an approximate of the measurement time, i.e. when controlling and processing unit 2 receives the data, is set in this case and the same is applied hereinafter) by respective body part, a calculating means 15 for calculating the average total weight of body from all of total weight of body within a specified period of time by using all of the measured data of partial weight of body within the specified period of time stored in the memory, a calculating means 16 for calculating the difference between the total weight of body in a standing position measured before and after the specified measurement time or their average and the average total weight of body, determining means 17 for determining if the difference does not exceed the predefined value, storing means 18 for storing in the memory respective partial weight of body and average respective partial weight of body responsive to defining weight fluctuations indicated in the measured data of partial weight of body within the specified measurement time as fluctuations in respective partial weight of body, defining the weight indicated in the measured data of partial weight of body as respective partial weight of body, defining the average value in fluctuations within the specified measurement time as the average respective partial weight of body when not exceeding the predefined value, and extracting and outputting means 19 for extracting the defined respective partial weight of body from the memory and outputting the extracted respective partial weight of body separately in order of measurement time.

Figure 4:
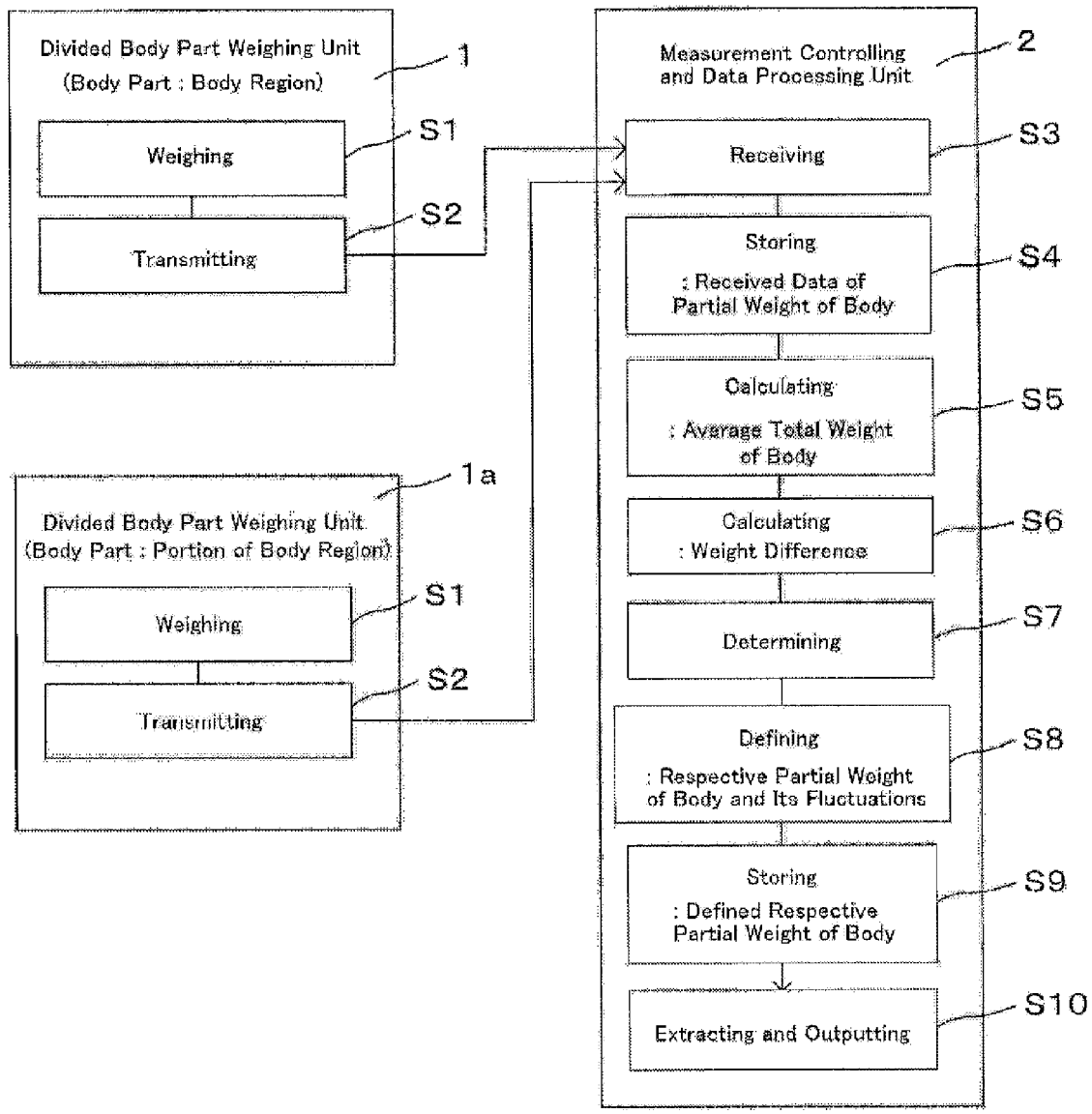
FIG. 4 is a flowchart showing a process with the measurement system according to embodiment 1 in the present invention.

Reference is now made to a flow of process of the measurement method using the measurement system in embodiment 1 of the present invention with reference to FIG. 4. The weighing units 1 and 1*a* continuously weigh a body part at regular intervals with the weighing means 11 (corresponding to weighing portion 7) controlled by the controlling and processing unit 2 (Step S1) and transmit the measured data of partial weight of body to the controlling and processing unit 2 (Step S2).

When the controlling and processing unit 2 receives the measured data of partial weight of body from the weighing units 1 and 1*a* (Step S3), the unit 2 stores the received data of partial weight of body in the memory in association with a measurement time by respective body part (Step S4), calculates an average total weight of body from all of total weight of body within the specified period of time by using all of the measured data of partial weight of body within the specified period of time stored in the memory (Step S5), calculates the difference between the total weight of body in a standing position measured before and after the specified measurement time or their average and the average total weight of body (Step S6), determines if the difference does not exceed the predefined value (Step S7), defines weight fluctuations indicated in the measured data of partial weight of body within the specified period of time as fluctuations in respective partial weight of body, defines the weight indicated in the measured data of partial weight of body as respective partial weight of body, defines the average value in fluctuations within the specified period of time as the average respective partial weight of body when not exceeding the predefined value (Step S8), stores in the memory the defined respective partial weight of body and average respective partial weight of body (Step S9), and extracts the defined respective partial weight of body from the memory at an external request or automatically and outputs the extracted respective partial weight of body separately in order of measurement time (Step S10).

<Procedure to Define Fluctuations in Respective Partial Weight of Body and Respective Partial Weight of Body>

Figure 6:
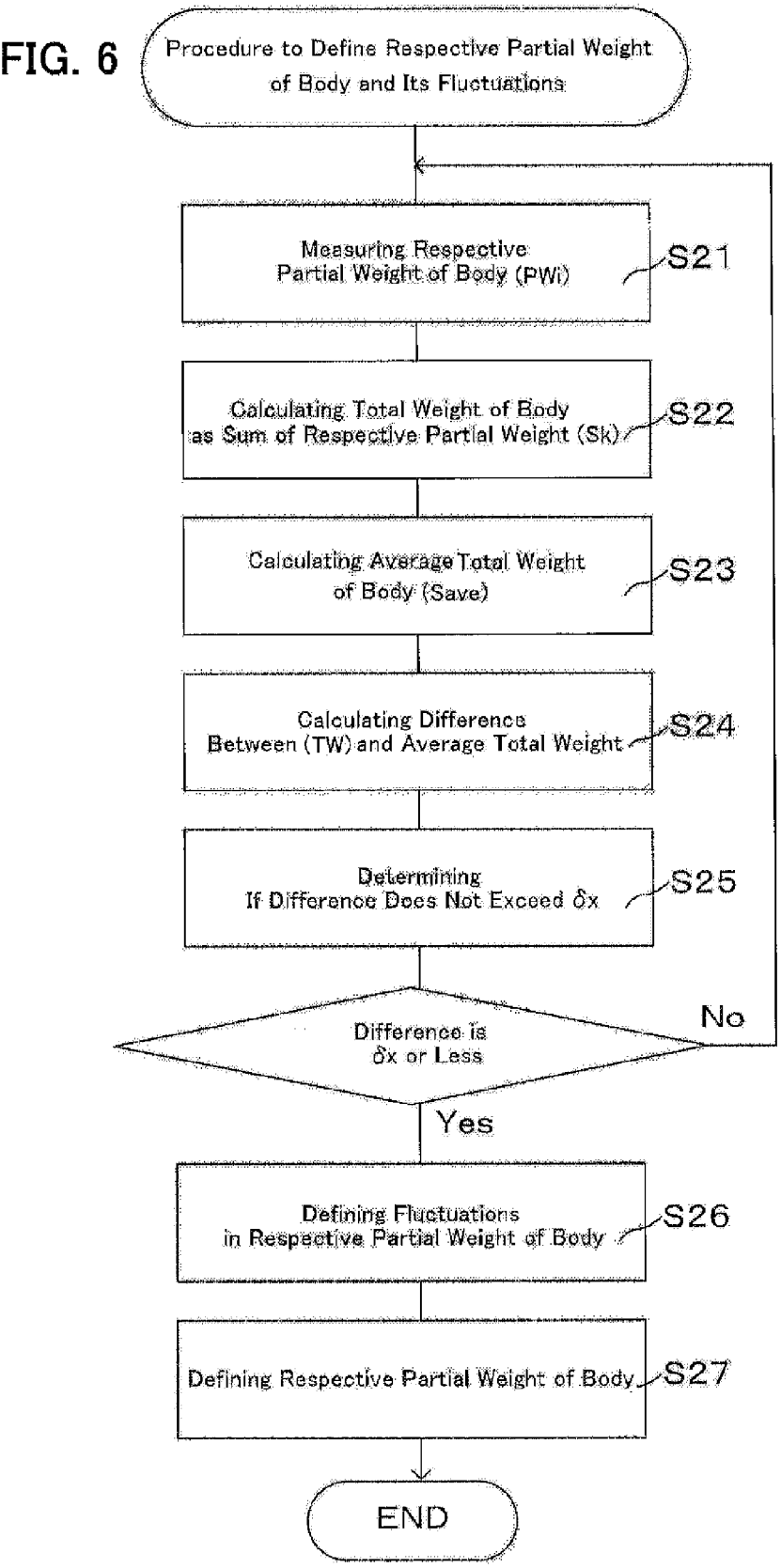
FIG. 6 is a flowchart showing a process of definition of fluctuations in respective partial weight of body and respective partial weight of body by the measurement method using the measurement system according to embodiment 1 in the present invention.

Reference is further made to a procedure to define fluctuations in respective partial weight of body and respective partial weight of body in the measurement method using the measurement system in embodiment 1 of the present invention with the data in FIG. 5 as an example with reference to FIG. 1 and FIG. 6.

The table in FIG. 5 shows the result of separate measurement of fluctuations in weight of five body regions (head, right arm, left arm, right leg, and left leg) and two portions of body region (breast and abdomen) (Step S21). The weight scales used as weighing units for seven body parts in the embodiment were a digital platform scale with RS232C output power as standard [model FG-30 KBM commercially available manufactured by A&D Company, Limited]. The scales were set at 2 g as minimum value displayed (resolution) and arranged as illustrated in FIG. 1.

In the table of FIG. 5, a subject, who is a 34-year-old woman weighing 47.28 kg in a standing position, was weighed for approx. one minute at approx. 0.1-sec interval. The woman was weighed for 58 seconds from 00:12:55 to 00:13:52 with 580 times of measurement at 0.1-sec interval, producing 580 measured values of partial weight of body and 4060 measured values of all of seven body parts. The table shows only a part of the values, for first and last 2.5 seconds.

Measurement numbers in the leftmost column denote the order of measurement. The measurement number 1 (corresponding to $t_1$) denotes the starting time of measurement at 00:12:55.0 (55 sec. 0) and the measurement number 580 denotes the ending time of measurement at 00:13:52.9 (52 sec.9). In the table, fluctuations in respective partial weight of body measured during the period of time are shown in respective columns of seven body parts. Respective partial weight of body measured almost simultaneously are shown in the same line, the sum of seven body parts (corresponding to total weight of body) at each measurement time is shown in the column second from right, the difference between the total weight of body and that in a standing position is shown in the rightmost column. Accordingly, the sum ($S_k$) of respective partial weight of body {PWi ($t_k$)} (PW is short for Partial Weight of body) at the measurement time $t_k$ is expressed in Formula 1.

$$S_k = \sum_{i=1}^{i=7} PWi(t_k) \qquad \text{Formula 1}$$
$$(i = 1 \sim 7)$$

The sum ($S_k$) corresponding to the total weight of body at each measurement time is calculated (Step S22). If the average of 580 measured values from $S_1$ to $S_{580}$ corresponding to the total weight of body at each measurement time is $S_{ave}$ (average total weight), the average $S_{ave}$ is expressed in Formula 2.

$$S_{ave} = \frac{1}{580} \times \sum_{k=1}^{k=580} S_k \qquad \text{Formula 2}$$

The average $S_{ave}$ is calculated (Step S23). As shown in second from right at the bottom line in the table of FIG. 5, $S_{ave}$=47.285 kg, and its difference between the total weight of body in a standing position (TW=47.28 kg, TW is short for Total Weight of body) is −0.005 kg (Step S24), which accords to the average difference between the total weight of body in a standing position and the total weight of body at each measurement time shown in the bottom of rightmost column. Its absolute value is as small as 5 g (0.01% of the total weight of body in a standing position).

If a tolerance is $\delta_x$ (Step S25), the result in the table meets a condition that "TW−$S_{ave}$≤$\delta_x$, and the value of tolerance $\delta_x$ is sufficiently small", thus, it is possible to define $S_{ave}$=TW, and if fluctuations with time in respective partial weight of body from the starting time $t_1$ to the ending time $t_r$ is VPWi, it is possible to define VPWi=PWi ($t_k$) (k=1 to r). Accordingly, fluctuations in weight shown in each column of respective partial weight of body can be defined as fluctuations in a specified partial weight of body within the specified period of time (58 seconds) (Step S26). If the tolerance $\delta_x$ is not sufficiently small, measurement is made again going back to Step S21.

Further, the average PWi of 580 measured values of respective partial weight of body within a specified period of time is expressed in Formula 3.

$$PWi = \frac{1}{580} \times \sum_{k=1}^{k=580} PWi(t_k) \qquad \text{Formula 3}$$

The average PWi calculated by Formula 3 is defined as the respective average partial weight of body PWi (i=1 to n) (Step S27). Hence respective average of fluctuations (among 850 measured values) in partial weight of body shown in the bottom line is defined by rounding off, as approx. 3.88 kg for the head, approx. 1.40 kg for the right arm, approx. 1.37 kg for the left arm, approx. 12.02 kg for the breast, approx. 20.49 kg for the abdomen, approx. 4.08 kg for the right leg, and approx. 4.05 kg for the left leg, respectively. The sum of these averages is 47.29 kg by rounding off so its difference between the total weight of body in a standing position is approx. 0.01 kg (0.02% of total weight of body in a standing position), which can be said to be sufficiently small.

Defining fluctuation data shown in each column is defined as fluctuations in a specified partial weight of body within a specified period of time makes it possible to add various analyses in terms of fluctuations in respective weight of body. For example, fluctuations in the breast and the abdomen are shown in graphs in FIG. 7 and FIG. 8, respectively, plotting the measurement time (time: minute: second) along the abscissa and the weight along the ordinate (kg), respectively. Periodic fluctuations shown in weight are connected to breathing and obviously indicate having something to do with blood flow.

Embodiment 2

Reference is now made to the measurement system in embodiment 2 of the present invention, wherein after weighing respective body regions, fluctuations in respective regional weight of body part and respective regional weight of body are defined. In the measurement system, as illustrated in FIG. 1, six weighing units 1 for separately weighing all of six body regions in a face-up position or in any other position and a measurement controlling and data processing unit 2 for controlling weighing units 1 and for processing measured data of regional weight of body received from weighing units 1 are connected so as to be freely transmittable. The weighing units 1a for weighing two portions of body region (breast and chest) shown in FIG. 1 are not used here.

In the measurement system, the whole body is measured with being divided into six body regions. The weighing units 1 are constituted in such a way as to separately weigh all of the six body regions. In FIG. 1 for example, the trunk is divided into the breast and the abdomen for weighing in embodiment 1, whereas the trunk is weighed without being divided in embodiment 2.

Figure 9:
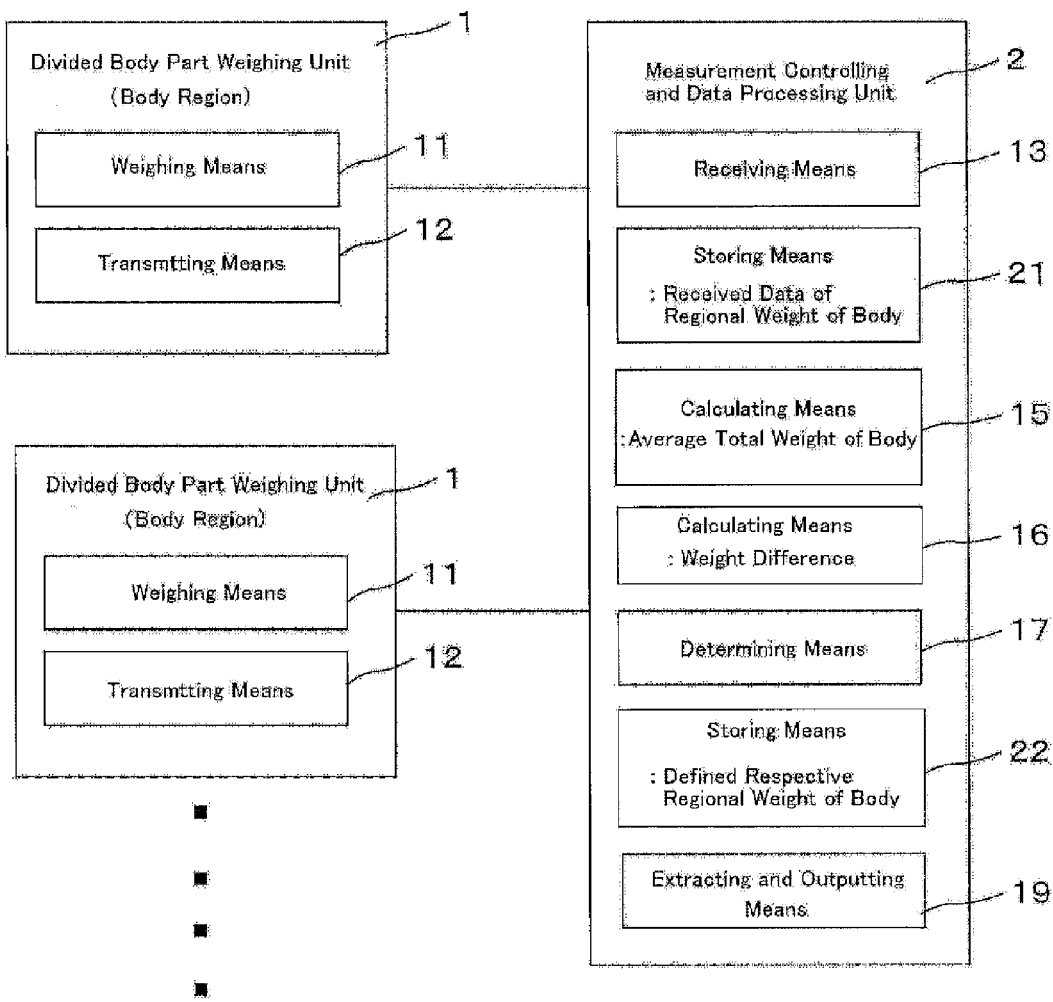
FIG. 9 is a functional chart showing the measurement system according to embodiment 2 in the present invention.

As shown in FIG. 9, the weighing units 1 have a weighing means 11 (corresponding to weighing portion 7) for continuously weighing body regions at regular intervals controlled by the controlling and processing unit 2 and a transmitting means 12 (corresponding to data transmitting-receiving portion 8) for transmitting the measured data of regional weight of body to the controlling and processing unit 2.

The controlling and processing unit 12 has a receiving means 13 for receiving the measured data of regional weight of body from the weighing units, a storing means 21 for storing the received data of regional weight of body by respective body region in a memory in association with a measurement time, a calculating means 15 for calculating the average total weight of body from all of the total weight of body within a specified period of time by using all of the measured data of regional weight of body within the specified period of time stored in the memory, a calculating means 16 for calculating the difference between the total weight of body in a standing position measured before and after the specified measurement time or their average and the average total weight of body, a determining means 17 for determining if the difference does not exceed the predefined value, a storing means 22 for storing in the memory respective regional weight of body and respective average of partial weight of body responsive to defining weight fluctuations indicated in the measured data of regional weight of body within the specified measurement time as fluctuations in weight of respective body region, defining the weight indicated in the measured data of regional weight of body as respective regional weight of body, and defining the average of fluctuations within the specified measurement time as respective average of regional weight of body when not exceeding the predefined value, and an extracting and outputting means 19 for extracting the defined respective regional weight of body from the memory and outputting the extracted respective regional weight of body separately in order of measurement time. It should be noted, however, that the storing means 21 and 22 have the same functions as the storing means 14 and 18 in FIG. 3 with storing different data from those in the storing means 14 and 18, respectively.

Figure 10:
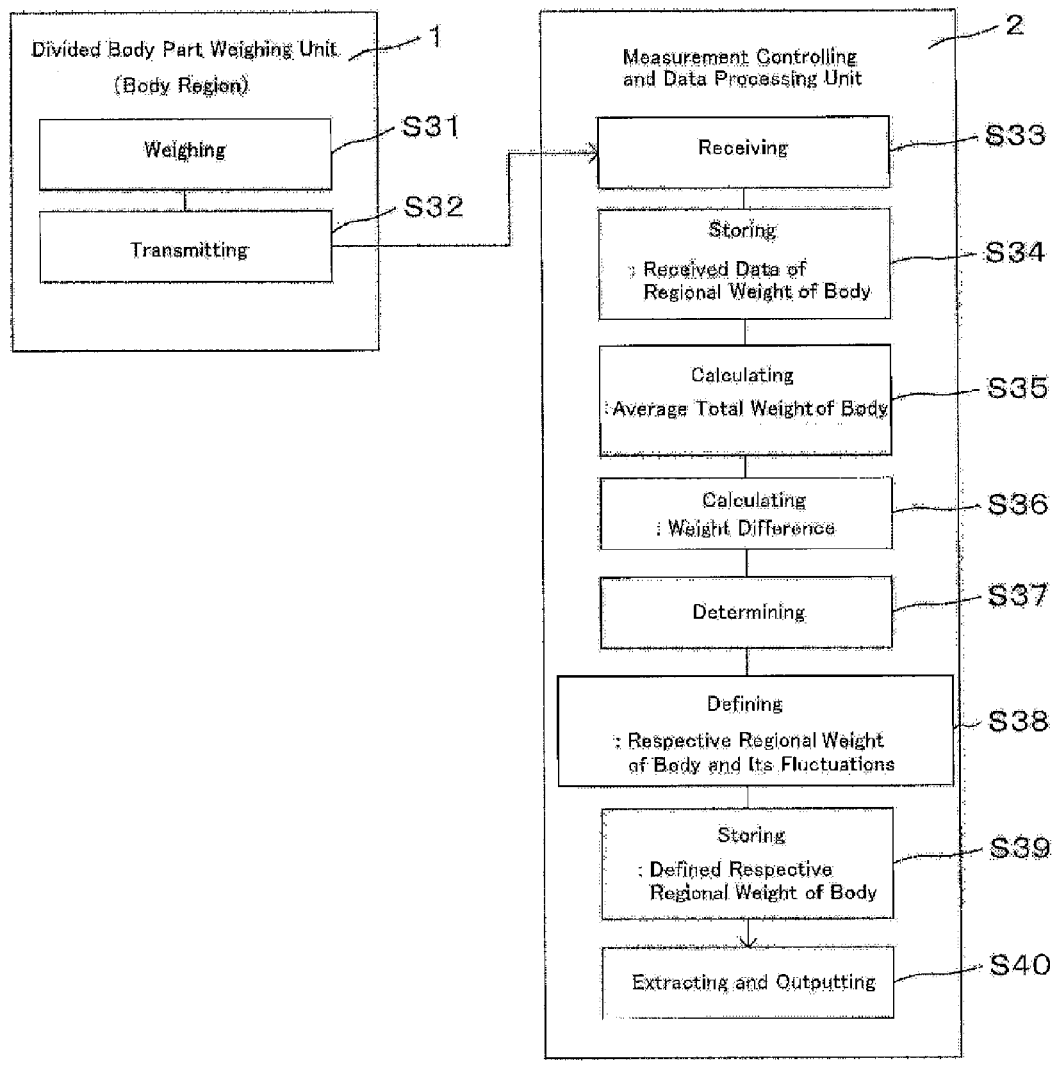
FIG. 10 is a flowchart showing a process with the measurement system according to embodiment 2 in the present invention.

Reference is now made to a flow of process of a measurement method in the measurement system of embodiment 2 of the present invention with reference to FIG. 10. The weighing units 1 continuously weigh body regions at regular intervals with the weighing means 11 (corresponding to weighing portion 7) controlled by the controlling and processing unit 12 (Step S31) and transmit the measured data of regional weight of body to the controlling and processing unit 2 (Step S32).

The controlling and processing unit 2 receives the measured data of regional weight of body from the weighing units 1 (Step S33), stores in the memory the received data of regional weight of body in association with a measurement time by respective body region (Step S34), calculates the average total weight of body from all of the total weight within the specified period of time by using all of the measured data of regional weight of body within the specified measurement time stored in the memory (Step S35), calculates the difference between the total weight of body in a standing position measured before and after the specified measurement time or their average and the average total weight of body (Step S36), determines if the difference does not exceed the predefined value (Step S37), defines weight fluctuations indicated in the measured data of regional weight of body within the specified measurement time as fluctuations in weight of respective body region, defines the weight indicated in the measured data of regional weight of body as respective regional weight of body, defines the average of fluctuations within the specified measurement time as respective average of regional weight of body when not exceeding the predefined value (Step S38), stores in the memory the defined respective regional weight of body and average respective regional weight of body (Step S39), and extracts the defined respective partial weight of body from the memory at an external request or automatically and outputs the extracted regional weight of body separately in order of measurement time (Step S40).

<Procedure to Define Fluctuations in Respective Regional Weight of Body and Respective Regional Weight of Body>

Figure 11:
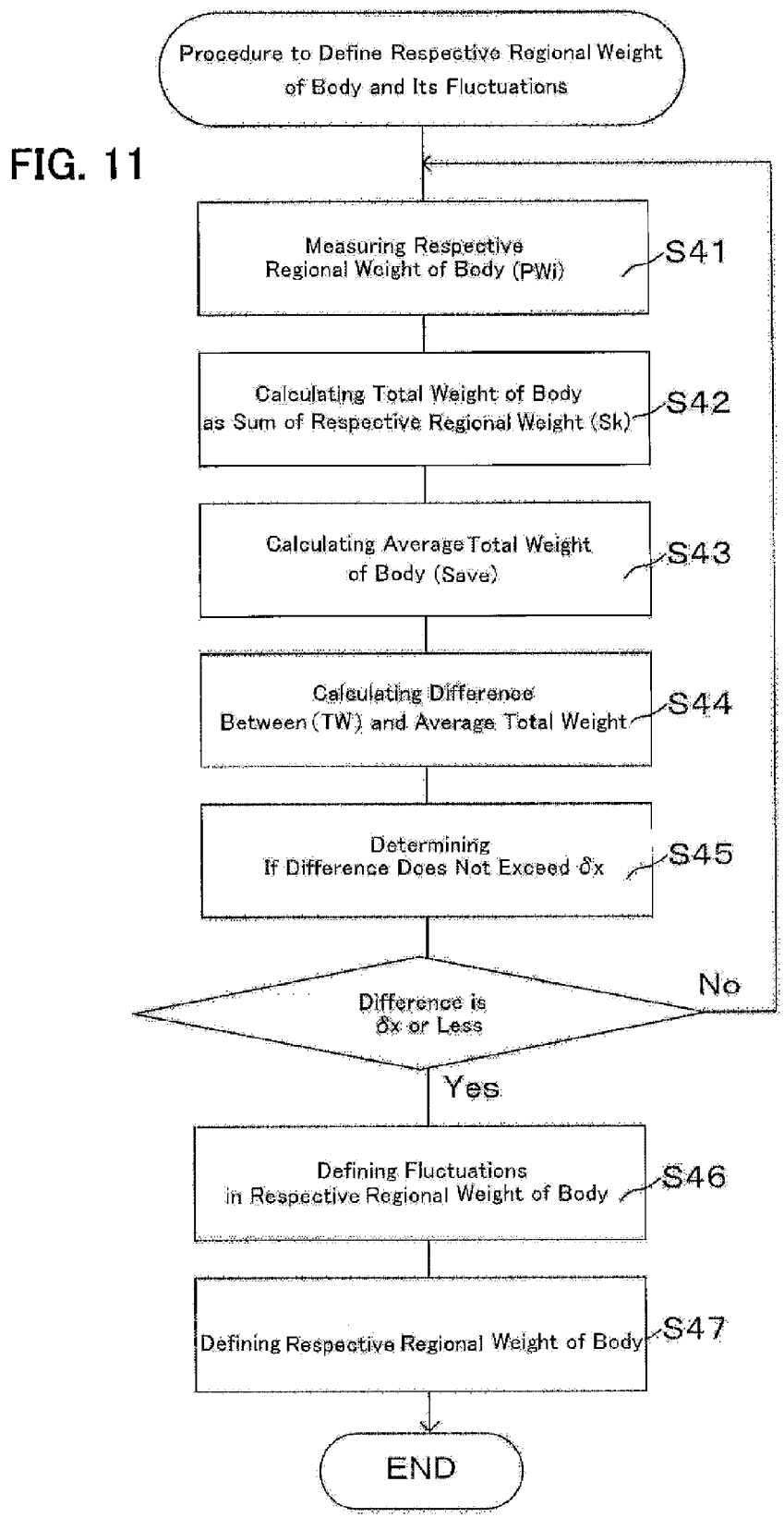
FIG. 11 is a flowchart showing a process of definition of fluctuations in respective partial weight of body and respective partial weight of body by the measurement method using the measurement system according to embodiment 2 in the present invention.

Reference is further made to the procedure to define fluctuations in respective regional weight of body and respective regional weight of body in the measurement system in embodiment 2 of the present invention with reference to FIG. 11.

First, the total weight of body in a standing position is measured right before starting measuring fluctuations in respective regional weight of body, or right after if necessary. And either one of the two or their average is defined as the average total weight of body in a standing position within a specified period of time. The total weight of body in a standing position TW is expressed as a function of time t, i.e. TW=TW(t), and considered to be almost constant within a specified time required for measuring fluctuations in respective regional weight of body. Thus either one of the two is defined as TW if two values do not differ significantly, or their average is defined as TW if the two values differ significantly.

Next, respective regional weight of body PWi is measured (Step S41). When the difference between an average of sum of respective regional weight of body (corresponding to the total weight of body) measured almost simultaneously at each measurement time obtained from all of respective regional weight of body within a specified period of time and the average total weight of body in a standing position does not exceed a predefined sufficiently small value, the average of sum of respective regional weight of body (the total weight of body) measured almost simultaneously at each measurement time is defined to be equal to the average total weight of body in a standing position, fluctuations with time in respective regional weight of body within the specified period of time are defined as fluctuations in respective regional weight of body, the measured weight of respective body region is defined as respective regional weight of body, and the average respective regional weight of body (measured value) as the respective average regional weight of body.

If the number of body regions constituting the whole body is expressed by the sign "i" (i=1 to n), a specified partial weight of body at No. "i" (PWi) is a function of time t and expressed as PWi=PWi (t). If a starting time is expressed as $T_1$, an ending time as $T_r$, and the total number of measurement of fluctuations in weight within the specified period of time as "r", the measurement time at No. "k" is expressed as $t_k$ (k=1 to r). A specified partial weight of body at No. "i" at the measurement time $t_k$ is expressed as PWi=PWi ($t_k$), and the sum $S_k$ of respective regional weight of body is expressed in Formula 4.

$$S_k = \sum_{i=1}^{i=n} PWi(t_k) \quad \text{Formula 4}$$

$$(i = 1 \sim n)$$

The sum $S_k$, which corresponds to the total body weight at a measurement time $t_k$, is calculated (Step S42). If the average of "r" number of measured values from $S_1$ to $S_r$ is expressed as $S_{ave}$ (average total weight of body), it is expressed in Formula 5.

$$S_{ave} = \frac{1}{r} \times \sum_{k=1}^{k=r} S_k \quad \text{Formula 5}$$

The average $S_{ave}$ is calculated (Step 43). Its difference between the total weight of body in a standing position (or average total weight of body in a standing position) TW is calculated (Step S44). The difference is determined if not exceeding a predefined value $\delta_x$ (Step S45). If the difference is sufficiently smaller than $\delta_x$, it is defined as TW−$S_{ave}$≤$\delta_x$, if $\delta_x$ is sufficiently small, it is defined as $S_{ave}$=TW, and the fluctuations in respective regional weight of body with time from a starting time $t_1$ to an ending time $t_r$, (Variation of PWi=VPWi, i=1 to n) is defined as VPWi=PWi ($t_k$) (k=1 to r) (Step S46). If $\delta_x$ is not sufficiently small, measurement is carried out again going back to Step S41. The average Pwi of "r" number of measured values of regional weight of body within the specified period of time is expressed in Formula 6.

$$PWi = \frac{1}{r} \times \sum_{k=1}^{k=r} PWi(t_k)$$ Formula 6

The average Pwi is defined as respective regional weight of body Pwi (i=1 to n) (Step S47).

Embodiment 3

Reference is now made to the measurement system in embodiment 3 of the present invention. In the embodiment, after defining fluctuations in respective regional weight of body and respective regional weight of body following the measurement using the measuring system in embodiment 2 of the present invention, portions of body region are weighed and then, fluctuations in respective portioned weight of body and respective portioned weight of body are defined. For example, one body region (the trunk) among six body regions is further divided into two portions of body region (breast and abdomen) for measuring fluctuations in respective weight.

As shown in FIG. 1, a plurality of weighing units 1 for separately weighing in a face-up position or in any other position all of the body regions divided from the whole body, a plurality of weighing units 1a for separately weighing respective portions of body region, and a measurement controlling and data processing unit 2 for controlling weighing units 1 and 1a and for processing measured data of regional and portioned weight of body received from weighing units 1 and 1a, respectively, are connected so as to be freely transmittable.

Figure 12:
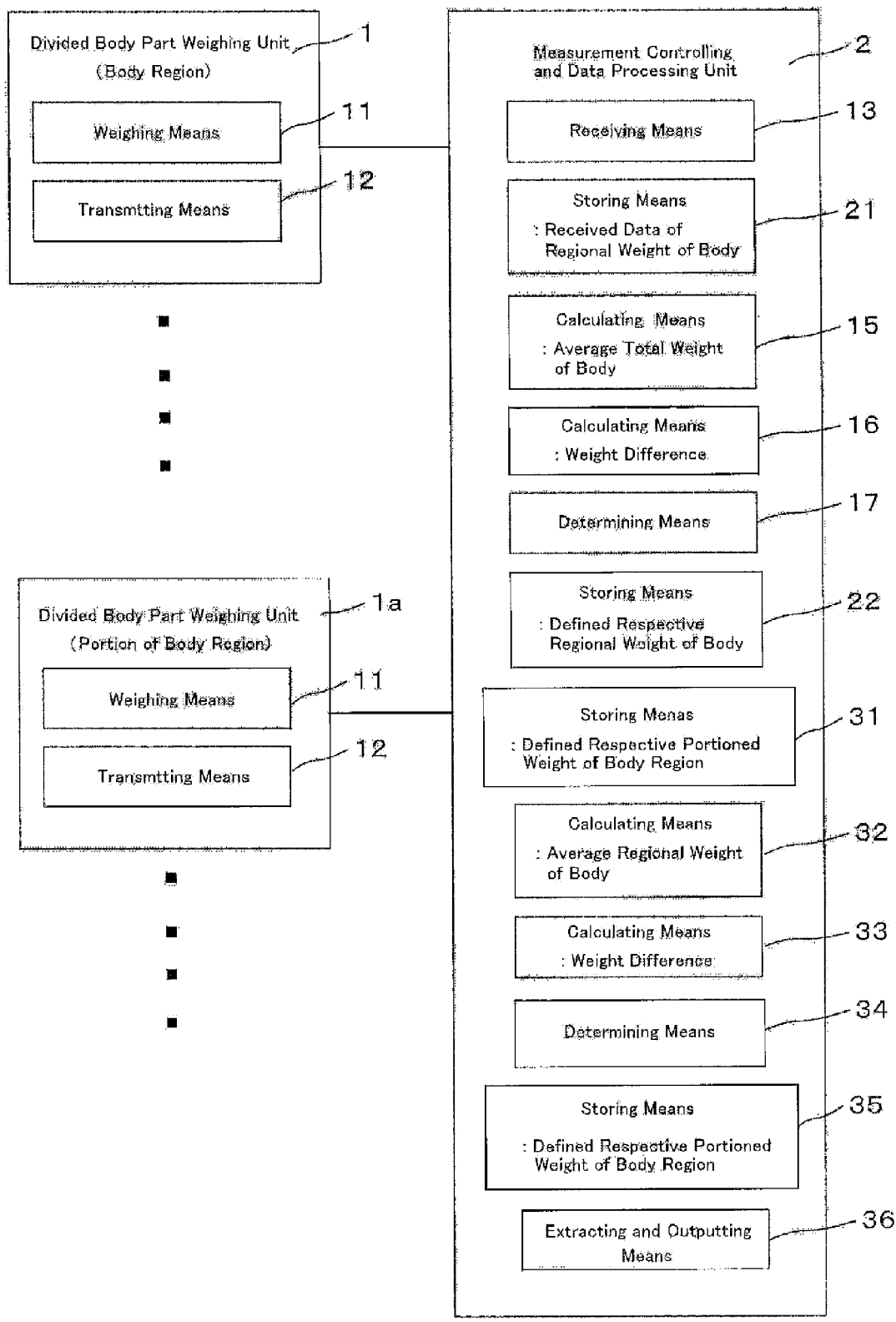
FIG. 12 is a functional chart showing the measurement system according to embodiment 3 in the present invention.

As shown in FIG. 12, the weighing units 1 and 1a have a weighing means 11 for continuously weighing body regions at regular intervals controlled by the controlling and processing unit 2 and a transmitting means 12 for transmitting the measured data of regional weight of body to the controlling and processing unit 2, respectively. The controlling and processing unit 2 has a receiving means 13 for receiving the measured data of regional weight of body from the weighing units 1, a storing means 21 for storing the received data of regional weight of body by respective body region in a memory in association with a measurement time, a calculating means 15 for calculating the average total weight of body from all of the total weight within the specified measurement time by using all of the measured data of regional weight of body within the specified measurement time stored in the memory, a calculating means 16 for calculating the difference between the total weight of body in a standing position measured before and after the specified measurement time or their average and the average total weight of body, a determining means 17 for determining if the difference does not exceed the predefined value, and a storing means 22 for storing in the memory respective regional weight of body and respective average of partial weight of body responsive to defining weight fluctuations indicated in the measured data of regional weight of body within the specified measurement time as fluctuations in weight of respective body region, defining the weight indicated in the measured data of regional weight of body as respective regional weight of body, and defining the average of fluctuations within the specified measurement time as respective average of regional weight of body when not exceeding the predefined value.

The weighing units 1a have a weighing means 11 for continuously weighing portions of body region at regular intervals controlled by the controlling and processing unit 2 and a transmitting means 12 for transmitting the measured data of portioned weight of body to the controlling and processing unit 2.

The controlling and processing unit 2 has a receiving means 13 for receiving the measured data of portioned weight of body region from the weighing units 1a, a storing means 31 for storing the received data of portioned weight of body region by respective portions of body region in a memory in association with a measurement time, a calculating means 32 for calculating an average specified regional weight of body from all of the specified regional weight of body within the specified period of time by using all of the measured data of portions of specified body region within the specified period of time stored in the memory, a calculating means 33 for calculating the difference between the specified average regional weight of body and its corresponding average regional weight of body previously defined, a determining means 34 for determining if the difference does not exceed the predefined value, a storing means 35 for storing in the memory respective portioned weight of body region and respective average of portioned weight of body region responsive to defining weight fluctuations indicated in the measured data of portioned weight of body region as fluctuations in respective portioned weight of body region, defining the weight indicated in the measured data of portioned weight of body region as respective portioned weight of body region, and defining the average of fluctuations within the specified measurement time as respective average of portioned weight of body region when not exceeding the predefined value, and an extracting and outputting means 36 for extracting the defined respective regional weight of body or respective portioned weight of body region from the memory and separately outputting the extracted respective regional weight of body and respective portioned weight of body region, respectively, in order of measurement time.

Figure 13:
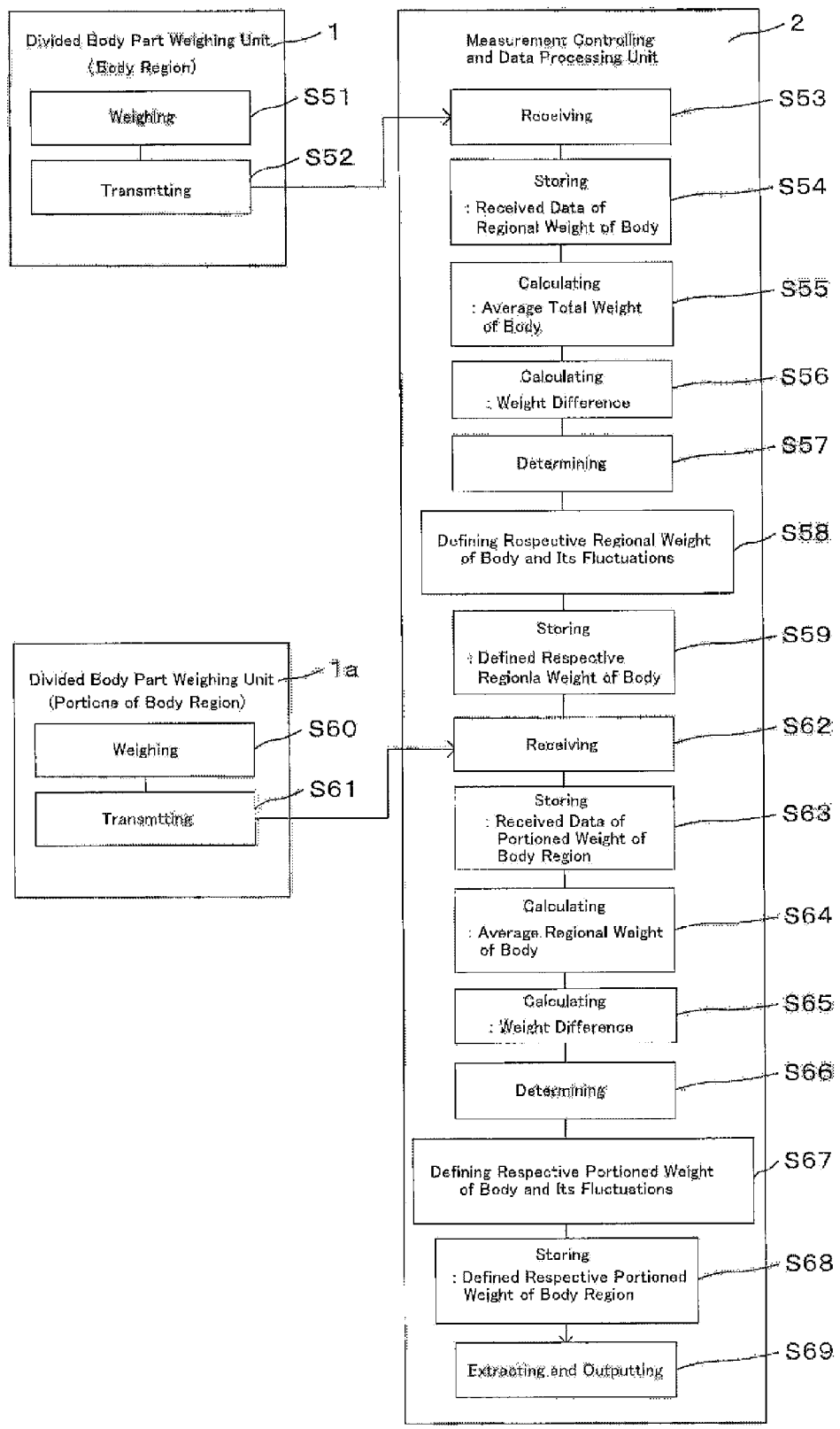
FIG. 13 is a flowchart showing a process with the measurement system according to embodiment 3 in the present invention.

Reference is now made to a flow of process of the measurement method using the measurement system in embodiment 3 of the present invention with reference to FIG. 13. The weighing units 1 continuously weigh body regions at regular intervals with the weighing means 11 (corresponding to weighing portion 7) controlled by the controlling and processing unit 2 (Step S51) and transmit the measured data of regional weight of body to the controlling and processing unit 2 (Step S52).

The controlling and processing unit 2 receives the measured data of regional weight of body from the weighing units 1 (Step S53), stores in the memory the received data of regional weight of body in association with a measurement time by respective body region (Step S54), calculates an average total weight of body from all of the total weight within the specified measurement time by using all of the measured data of regional weight of body within the specified measurement time stored in the memory (Step S55), calculates the difference between the total weight of body in a standing position measured before and after the specified measurement time or their average and the average total weight of body (Step S56), determines if the difference does not exceed the predefined value (Step S57), defines weight fluctuations indicated in the measured data of regional weight of body within the specified measurement time as fluctuations in weight of respective body region, defines the weight indicated in the measured data of regional weight of body as respective regional weight of body, defines the average of fluctuations within the specified measurement time as respective average of regional weight of body when not exceeding the predefined value (Step S58), and stores in the memory the defined respective regional weight of body and average respective regional weight of body (Step S59).

The weighing units 1a continuously weigh portions of body region at regular intervals with the weighing means 11 (corresponding to weighing portion 7) controlled by the controlling and processing unit 2 (Step S60) and transmit the measured data of portioned weight of body region to the controlling and processing unit 2 (Step S61).

The controlling and processing unit 2 receives the measured data of portioned weight of body region from the weighing units 1a (Step S62), stores in the memory the received data of portioned weight of body region in association with a measurement time by respective portions of body region (Step S63), calculates an average specified regional weight of body from all of the specified regional weight of body within a specified measurement time by using all of the measured data of portioned weight of body region within the specified measurement time stored in the memory (Step S64), calculates the difference between the average specified regional weight of body and its corresponding average regional weight of body previously defined (Step S65), determines if the difference does not exceed the predefined value (Step S66), defines weight fluctuations indicated in the measured data of portioned weight of body region as fluctuations in respective portioned weight of body, defines the weight indicated in the measured data of portioned weight of body region as respective portioned weight of body region, and defines the average of fluctuations within the specified measurement time as average respective portioned weight of body region when not exceeding the predefined value (Step S67), and stores in the memory the defined respective portioned weight of body region and average respective portioned weight of body region (Step S68).

And the controlling and processing unit 2 extracts the defined respective regional weight of body and respective portioned weight of body region from the memory at an external request or automatically and separately outputs the extracted respective regional weight of body and respective portioned weight of body region in order of measurement time respectively (Step S69).

<Procedure to Define Fluctuations in Respective Portioned Weight of Body Region And Respective Portioned Weight of Body Region>

Figure 14:
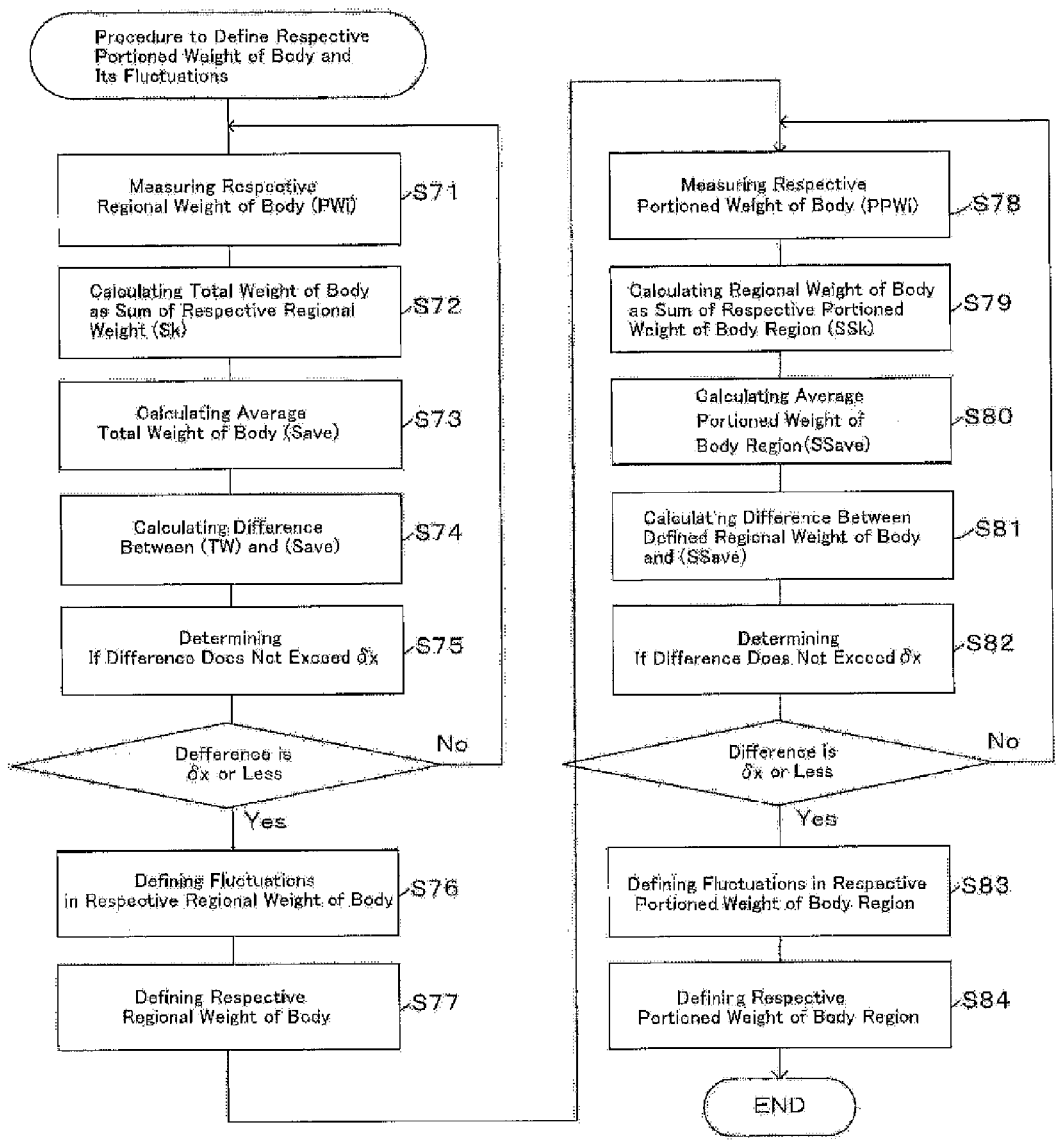
FIG. 14 is a flowchart showing a process of definition of fluctuations in respective partial weight of body and respective partial weight of body by the measurement method using the measurement system according to embodiment 3 in the present invention.

Reference is further made to the procedure to define fluctuations in respective portioned weight of body region and respective portioned weight of body region in the measurement method using the measurement system according to embodiment 3 of the present invention with reference to FIG. 14.

As shown in FIG. 14, first respective regional weight of body is defined (Step S77), and then respective portioned weight of body is defined (Step S84). Steps S71 to S77 to define respective regional weight of body are the same as Steps S41 to S47 of the procedure to define fluctuations in respective regional weight of body and to define respective regional weight of body in embodiment 2 as shown in FIG. 11 and are not mentioned here.

Following Step S77, respective portioned weight of body region PPWi is measured (Step S78). When the difference between an average of sum (corresponding to specified regional weight of body at each measurement time) of respective portioned weight of body region measured almost simultaneously at each measurement time obtained from all of respective portioned weight of body region within a specified period of time and respective regional weight of body defined at Step S47 as shown in a flow of FIG. 11 does not exceed a predefined sufficiently small value, the average of sum of respective portioned weight of body region (corresponding to specified regional weight of body at each measurement time) measured almost simultaneously at each measurement time is defined to be equal to the specified regional weight of body, fluctuations with time in respective portioned weight of body region within the specified period of time are defined as fluctuations in respective portioned weight of body region, the measured weight of respective portioned weight of body region is defined as respective portioned weight of body region, and the average respective portioned weight of body region as the respective average portioned weight of body region.

When the number of portions of body region is expressed by the sign "j" (j=1 to m), a specified portioned weight at No. "j" of a specified partial weight of body at No. "i" (PPWij) is a function of time T and expressed as PPWij=PPWij (t). If a starting time is expressed as $T_1$, an ending time as $T_r$, and the total number of measurement of fluctuations in weight within the specified period of time as "r", the measurement time at No. "k" is expressed as $t_k$ (k=1 to r). A specified portioned weight at No. "j" of a specified partial weight of body at No. "i" at the measurement time $t_k$ is expressed as PPWij=PPWij $(t_k)$, and the sum $SS_k$ of respective portioned weight of body region is expressed in Formula 7.

$$SS_k = \sum_{j=1}^{j=m} PPWij(t_k),$$

$$(j = 1 \sim m)$$

Formula 7

The sum $SS_k$, which corresponds to the specified (at No. "i") regional weight of body at a measurement time $t_k$, is calculated (Step S79). If the average of "r" number of measured values from $SS_1$ to $SS_r$ corresponding to regional weight of body at each measurement time is expressed as $SS_{ave}$, it is expressed in Formula 8.

$$SS_{ave} = \frac{1}{r} \times \sum_{k=1}^{k=r} SS_k$$

Formula 8

The average $SS_{ave}$ is calculated (Step S80). Its difference between respective partial weight of body PWi defined at Step S77 (corresponding to Step S47 in FIG. 11) is sufficiently small, it is defined as PWi−$SS_{ave}$≤$\delta_x$, if $\delta_x$ is sufficiently small, it is defined as $SS_{ave}$=PWi, and the fluctuations in respective portioned weight of body region with time from a starting time $t_1$ to an ending time $t_r$, (Variation of PPWij=VPPWi, j=1 to m) is defined as VPPWi=PPWi $(t_k)$ (k=1 to r) (Step S83). If $\delta_x$ is not sufficiently small, measurement is carried out again going back to Step S78.

The average PPWij of "r" number of measured values of portioned weight of body region at No. "i" within the specified period of time is expressed in Formula 9.

$$PPWij = \frac{1}{r} \times \sum_{k=1}^{k=r} PPWij(t_k)$$ Formula 9

The average PPWij is defined as respective portioned weight of body region PPWij (j=1 to n) (Step S84). Meanwhile, when a specified regional weight is considered to be almost unchanged within a specified period of time, the unchanged value is used as the specified regional weight of body PWi regardless of the flow from Step S71 to S77, and fluctuations in respective portioned weight of body region and respective portioned weight of body as described above.

Figure 7:
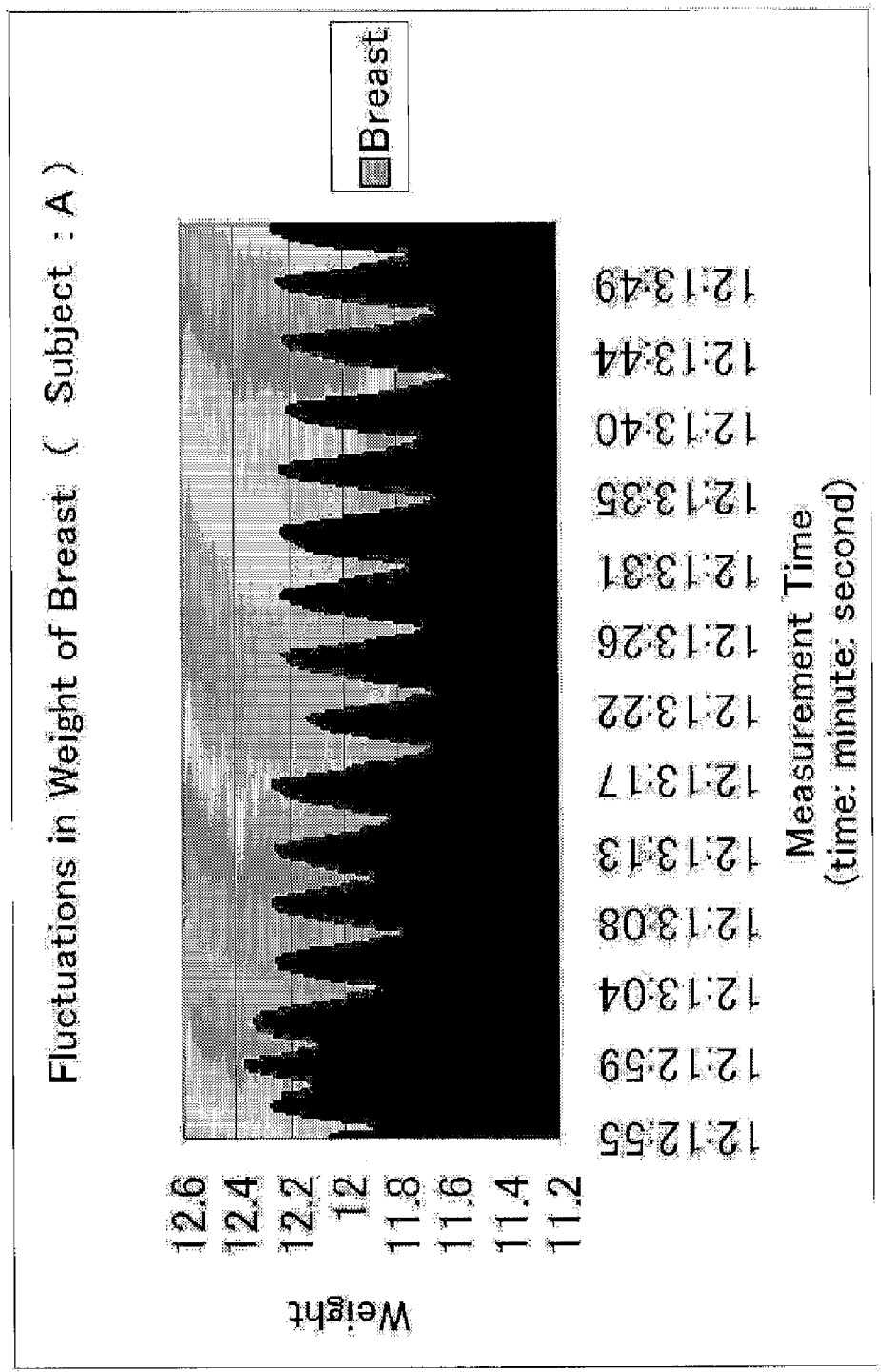
FIG. 7 is a graph showing fluctuations in weight of the breast of a subject A during measurement using the measurement system according to embodiment 1 in the present invention.
Figure 8:
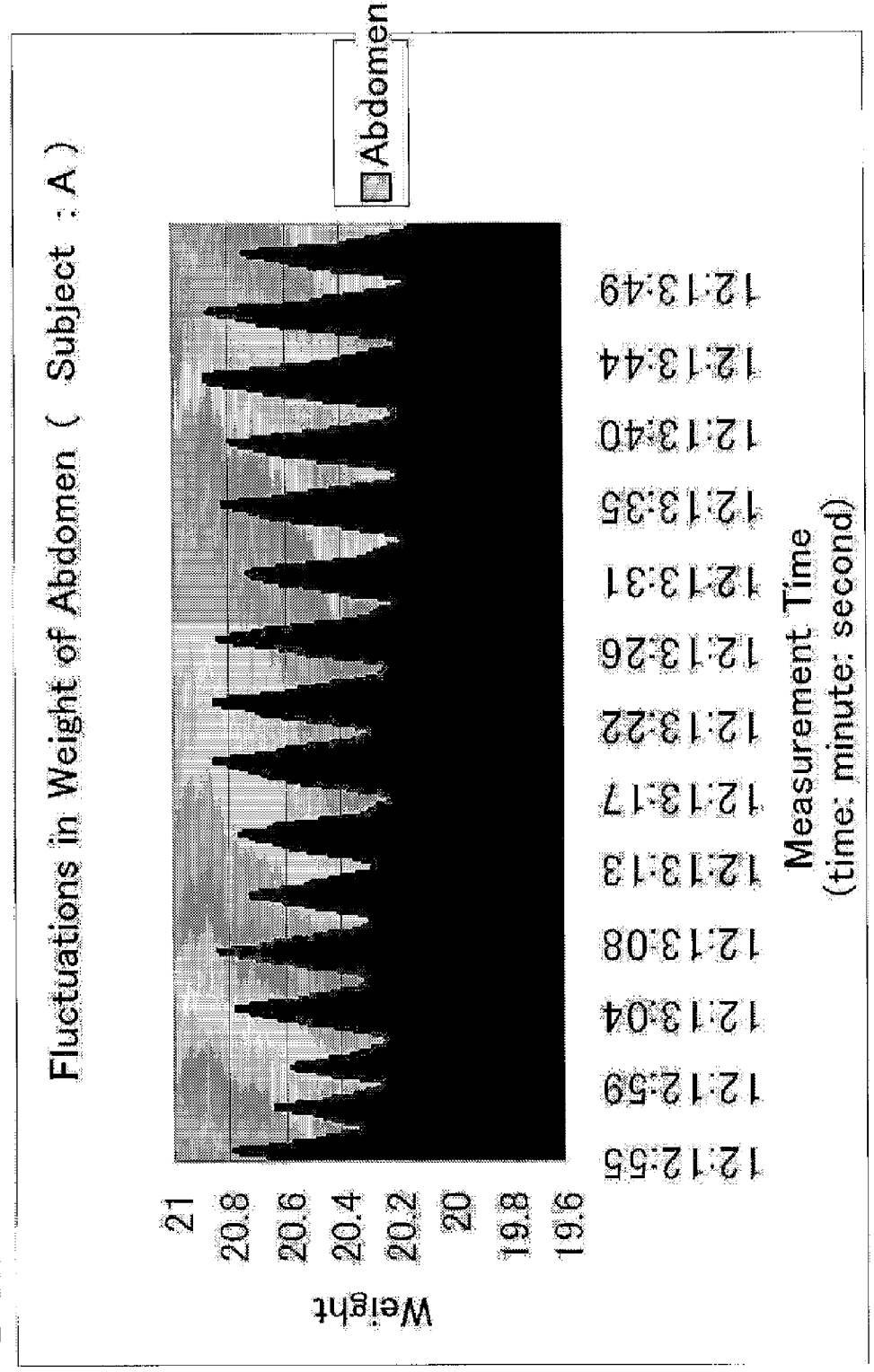
FIG. 8 is a graph showing fluctuations in weight of the abdomen of a subject A during measurement using the measurement system according to embodiment 1 in the present invention.
Figure 15:
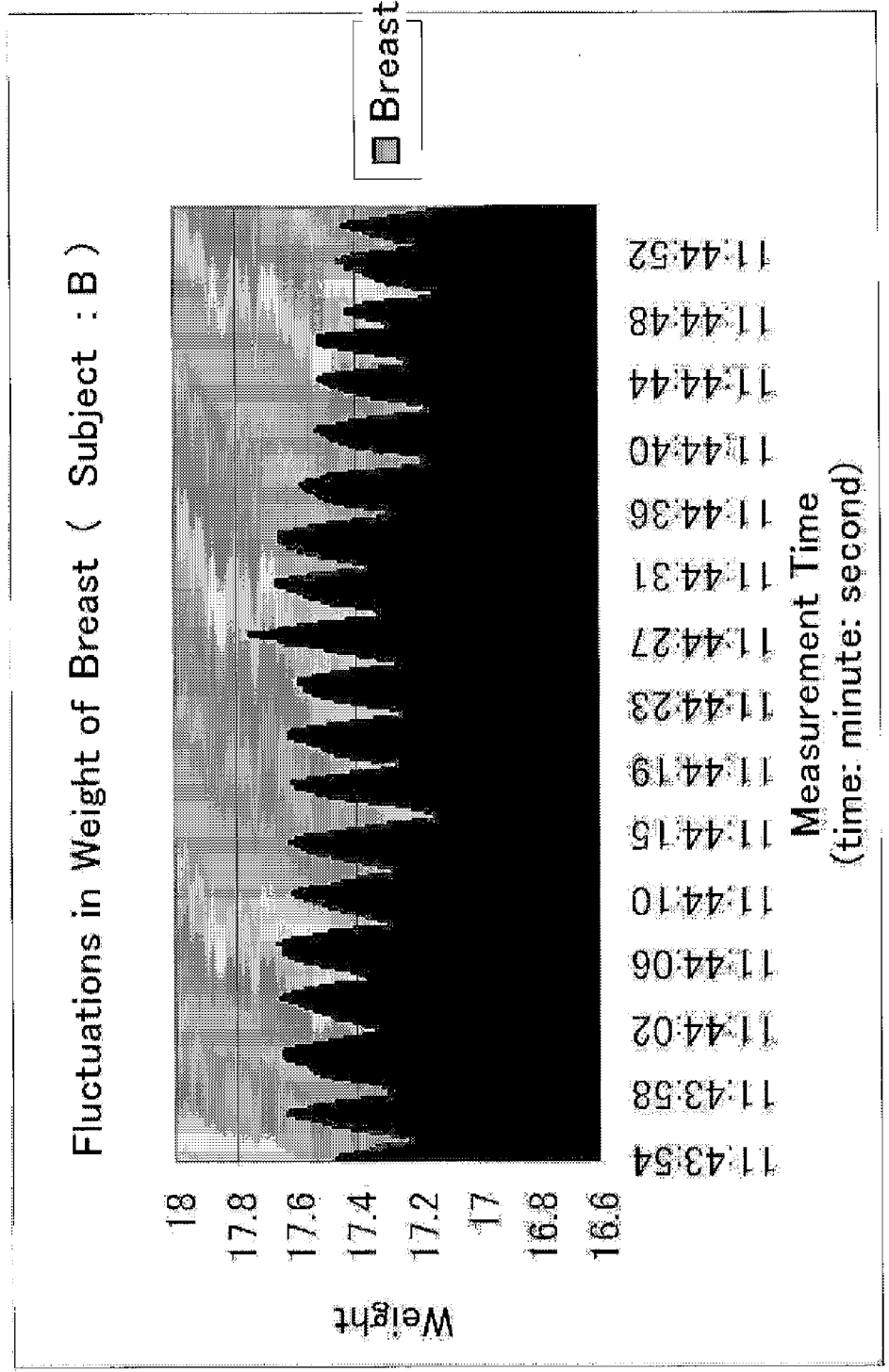
FIG. 15 is a graph showing fluctuations in weight of the breast of a subject B during measurement using the measurement system according to embodiment 1 in the present invention.
Figure 16:
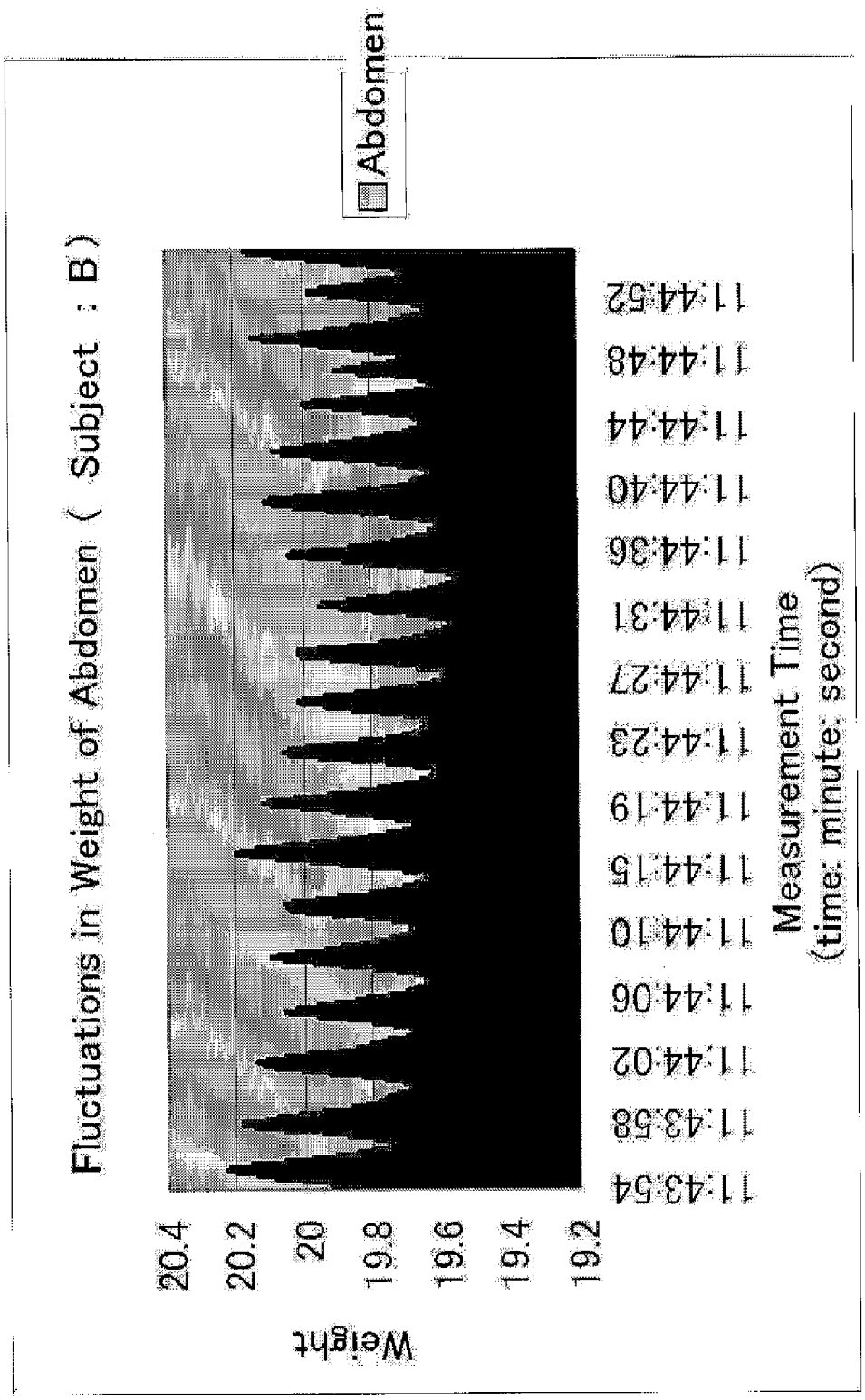
FIG. 16 is a graph showing fluctuations in weight of the abdomen of a subject B during measurement using the measurement system according to embodiment 1 in the present invention.
Figure 17:
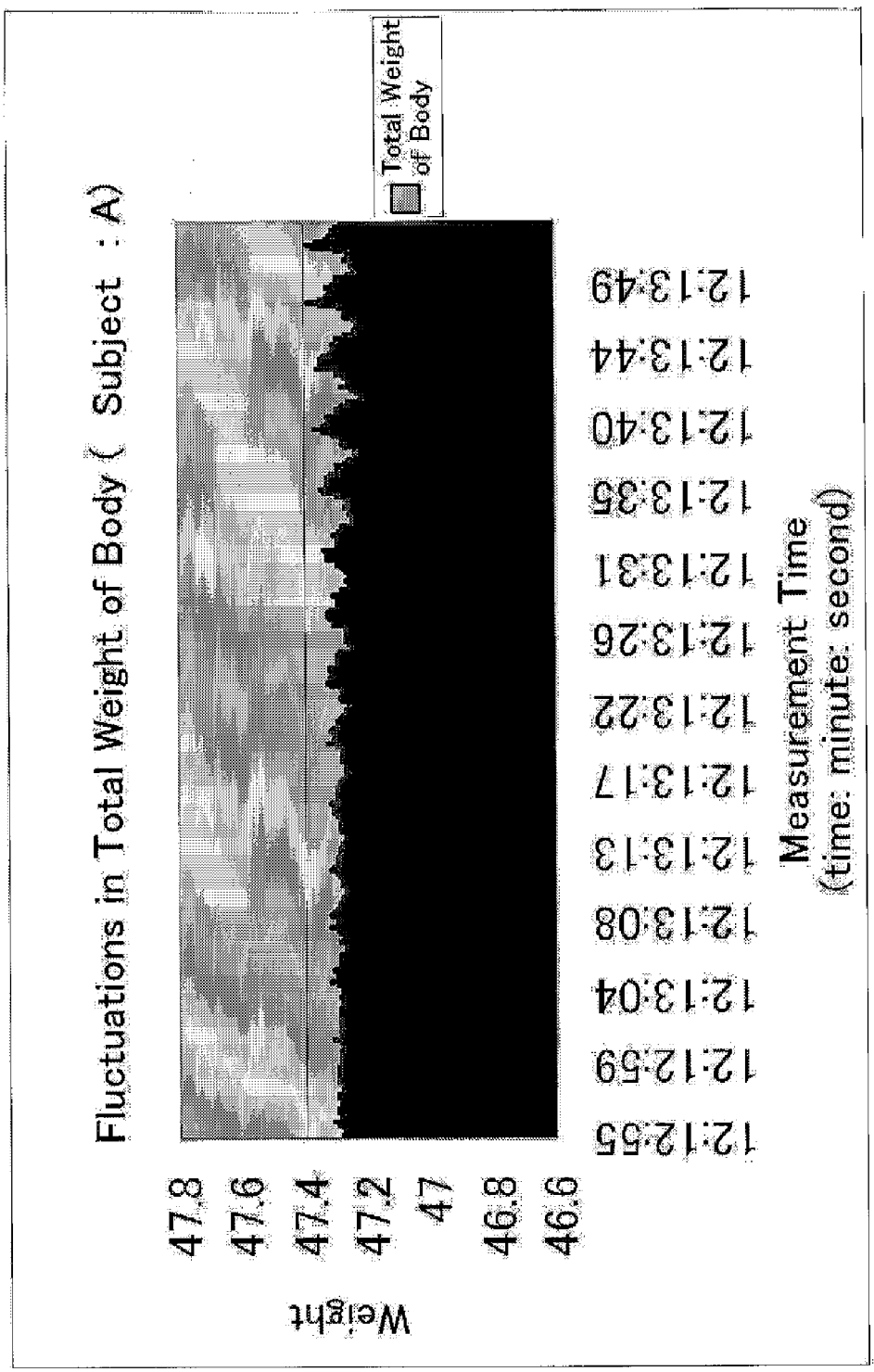
FIG. 17 is a graph showing fluctuations in total weight of a subject A during measurement using the measurement according to embodiment 1 in the present invention.

In FIG. 15 and FIG. 16, a part of measured data of fluctuations in respective portioned weight of body, the breast and the abdomen, of a subject B who is a 73-year-old man weighing 51.82 kg in a standing position. In this case, similar to the case of subject A, periodic fluctuations in weight were observed. Basically, similar periodic fluctuations were observed in other body parts, such as the head, which especially shows complex fluctuations seemingly due to a delicate impact from the neck. In FIG. 17 showing fluctuations in total weight of the body of the subject A within a specified period of time, of course, no such distinct periodic fluctuations as seen in FIG. 7 and FIG. 8 were observed. Slight fluctuations seen in later of the period of the time may reflect a stir by breathing.

Figure 18:
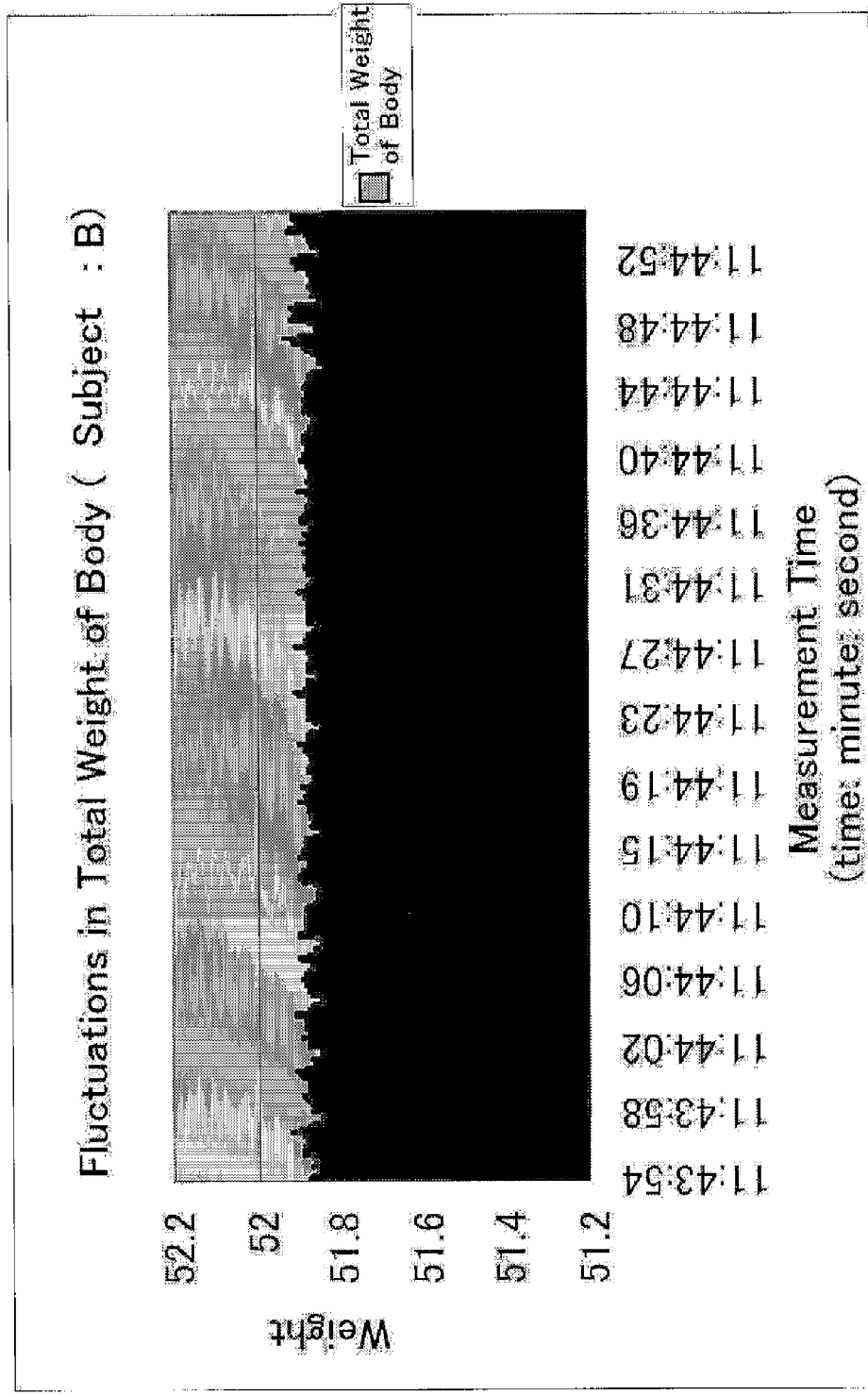
FIG. 18 is a graph showing fluctuations in total weight of the body of a subject B during measurement of fluctuations in weight of respective divided body with a measurement system of fluctuations in weight of respective divided body according to embodiment 1 in the present invention.
Figure 19:
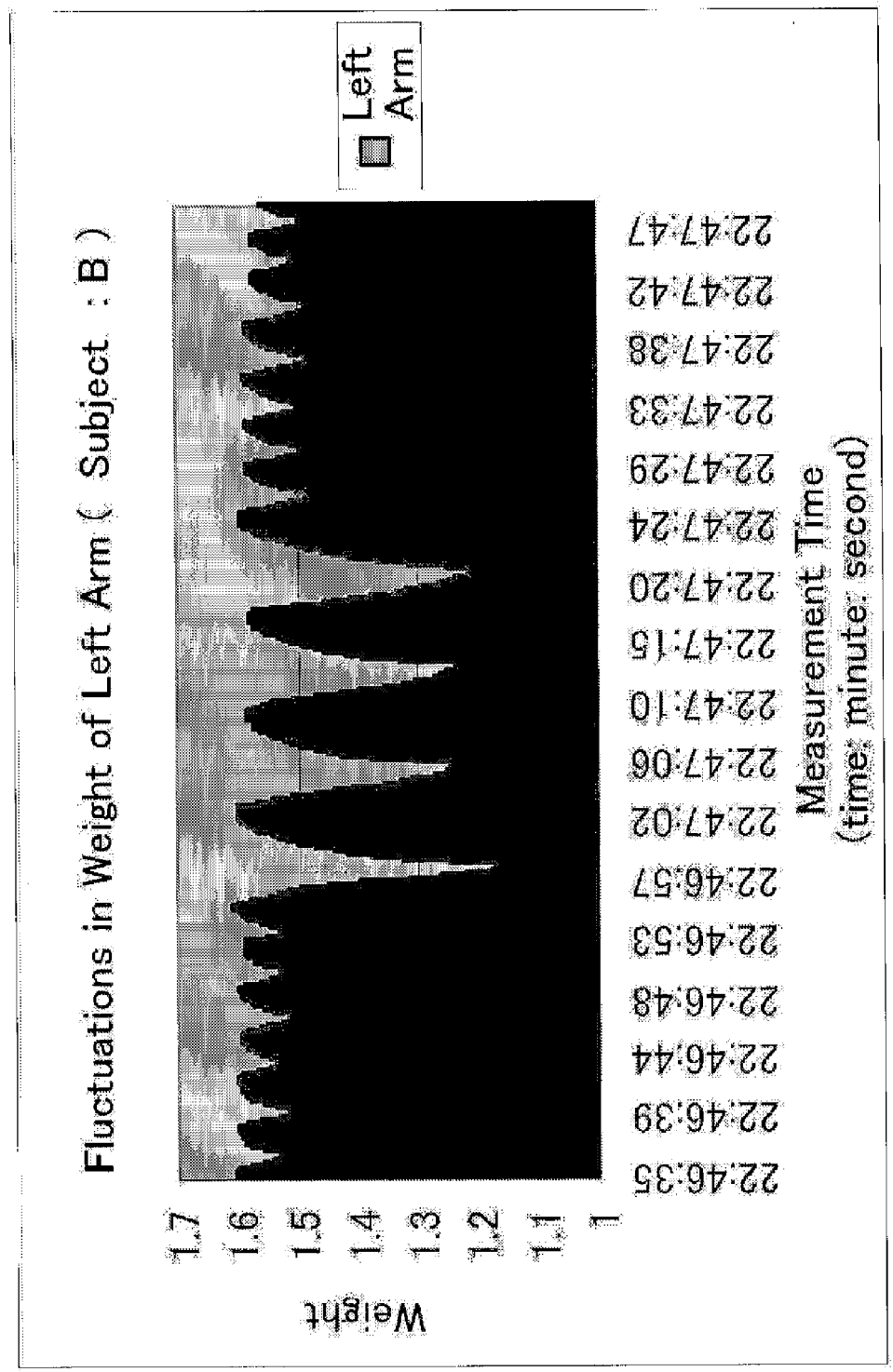
FIG. 19 is a graph showing fluctuations in weight of the left arm of a subject B when breathing deeply during measurement using the measurement system according to embodiment 1 in the present invention.
Figure 20:
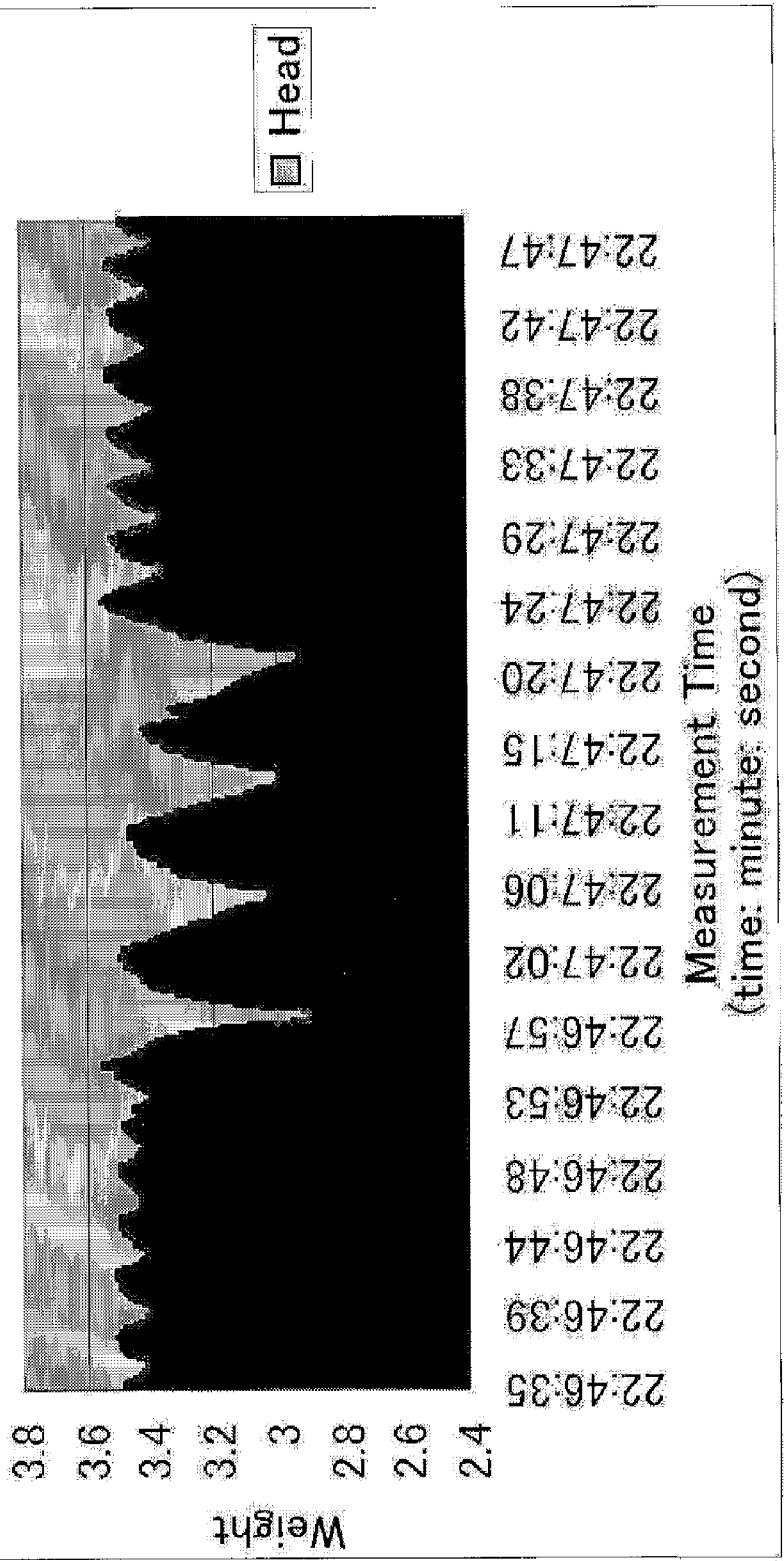
FIG. 20 is a graph showing fluctuations in weight of the head of a subject B when breathing deeply during measurement using the measurement system according to embodiment 1 in the present invention.

In FIG. 18 showing fluctuations in total weight of the body of the subject B within a specified period of time, no such distinct periodic fluctuations as seen in FIG. 15 and FIG. 16 were observed. Further, FIG. 19 and FIG. 20 show fluctuations in weight of the left arm, and the head, respectively, of the subject B weighing 53.26 kg in a standing position two hour after a meal when breathing deeply. As seen in FIG. 19 and FIG. 20, such periodic fluctuations as seen in FIG. 15 and FIG. 16 were seen even in the left arm and the head with normal breathing; however, distinct fluctuations in respective partial weight of body occurred four times at every deep breath, which were taken four times from around 22:46:55 to 22:47:24, and the periodic fluctuations spontaneously reoccurred after returning to normal breathing.

Figure 21:
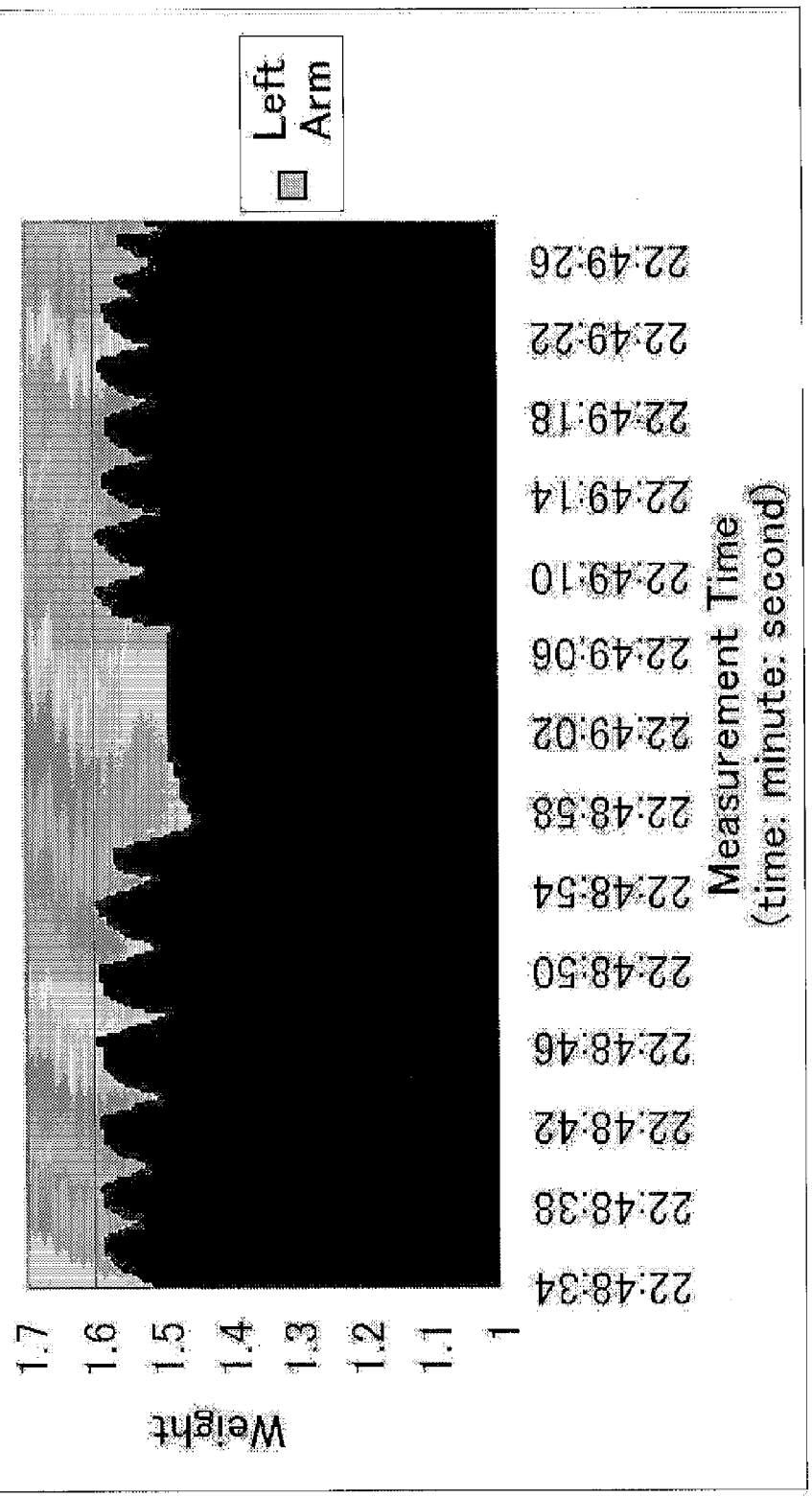
FIG. 21 is a graph showing fluctuations in weight of the left arm of a subject B when pausing of breathing during measurement using the measurement system according to embodiment 1 in the present invention.
Figure 22:
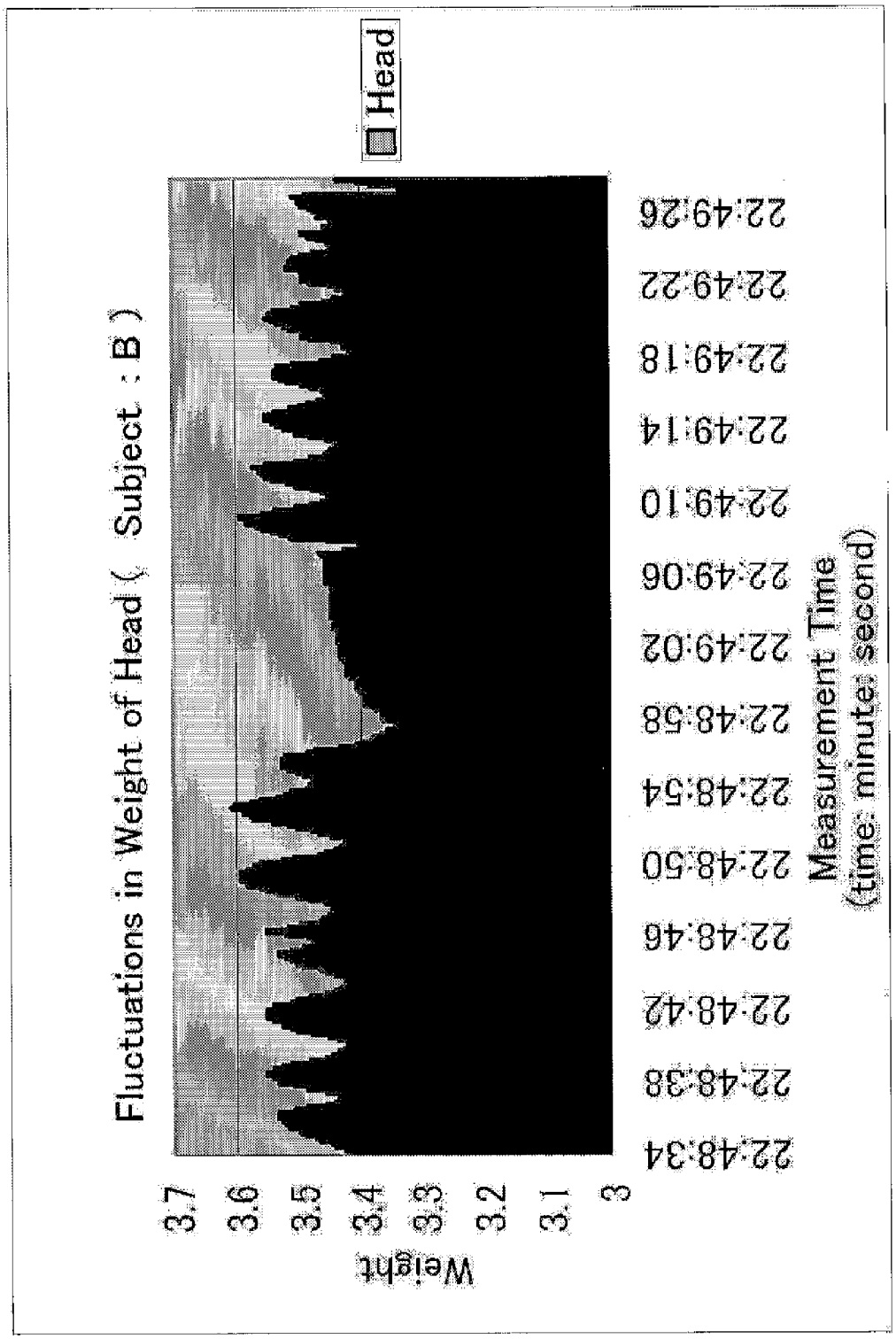
FIG. 22 is a graph showing fluctuations in weight of the head of a subject B when pausing of breathing during measurement using the measurement system according to embodiment 1 in the present invention.

Next, as seen in FIG. 21 and FIG. 22, periodic fluctuations suspended when pausing of breathing for about ten seconds from 22:48:58 to 22:49:07 and spontaneously reoccurred upon restarting normal breathing. This highly implied a connection between periodic fluctuations in weight, in particular, and breathing. In this way, the measurement system in the present invention enables measurement of fluctuations in any given weight of body parts and is expected to be used for individual health control.

The measurement system of the present invention may be used solely as shown in FIG. 1. Alternatively, the measurement system in whole or in part may be incorporated in an operation table to be of help in an operation. For example, at each stage before, during and after the operation, understanding the blood circulation, controlling anesthetized state, checking fluctuations in a relevant regional weight caused by blood loss, removal of body tissue or organs, childbirth, and checking articles left in the body regarding the whole body or respective body region by precisely measuring and analyzing fluctuations in respective regional weight of body with or without anesthesia. Similarly, the measurement system in whole or in part may be incorporated in an examination table to be of help in medical examination.

<Utilization of the Measurement Method in a Specified Divided Body Part>

In the measurement system and the measurement method of the present invention, when transfer of substance internally and externally in a subject is not apparently recognized, measurement results of fluctuations in weight of a specified divided body part that are measured and defined through the flows shown in FIGS. 1, 11, and 14 are analyzed in depth solely or in association with another data of such as respiratory rate, heart rate, blood pressure, data obtained by using various imaging analysis technologies (MRI, CT, PET, etc.), and various biochemical values. This serves to understand physiology, metabolism, nutriture and maintain and enhance health condition of a subject through (1) becoming possible to understand fluctuations (including their speed) in weight and the amount of inflowing, staying, and outflowing blood, etc. per unit time in a specified divided body part within a specified period of time (2) becoming possible to understand fluctuations (including their speed) in weight and the amount of inflowing, staying, and outflowing blood, etc. per unit time in a specified tissue or organ in a specified divided body part within a specified period of time (3) becoming possible to obtain information on fluctuations in weight with time regarding the amount of generating, accumulating, and transferring of metabolic substance and body waste such as lymph, primitive urine, urine, and gut content.

<Utilization to Optimize Process of Intended Transfer of Substance Internally or Externally>

With the measurement system and the measurement method of the present invention, in cases of (1) transfer of substance into the body from the outside (such as drip) or (2) transfer or process of blood or the like from the body and out of the body (such as dialysis including hemodialysis and hemofiltration, and artificial heart lung, wherein a part of or most of blood or the like within a specified short to long time are flown out of the body and refluxed into the body after proper treatment), becoming possible to obtain information that are helpful on controlling and assessing a process of the substance including blood by analyzing the measured data of changes and fluctuations in weight of the specified divided body part of a subject serves to understand physiology, metabolism, nutriture and maintain and enhance health condition of a subject.

<Utilization in Controlling Various Processes Before, During, and after a Surgical Operation>

The measurement system and the measurement method in whole or in part may be incorporated in an operation table to be of help in an operation. Precisely measuring and analyzing fluctuations in respective regional weight of body with or without anesthesia at each stage before, during and after the operation, leads to understanding the blood circulation, controlling anesthetized state, checking fluctuations in a relevant regional weight caused by blood loss, removal of body tissue or organs, childbirth, and checking articles left in the body regarding the whole body or respective body region. This serves to understand physiology, metabolism, nutriture and maintain and enhance health condition of a subject.

REFERENCE NUMERALS

1 divided body part weighing unit
2 measurement controlling and data processing unit
11 weighing means
13 receiving means
14, 21, 22, 31, 35 storing means

What is claimed is:

1. A measurement system which measures fluctuations in weight of respective divided body parts comprising:

first divided body part weighing units for separately weighing respective body regions and second divided body part weighing units for separately weighing respective portions of another body region, the respective body regions and the another body region being divided from a whole body, the first and second body part weighing units collectively weighing the whole body, the respective body regions separately weighed by the first divided body part weighing units including a head, a right arm, a left leg, a right leg, and a left leg in a face-up position or any other given position, the respective portions of the another body region separately weighed by the second divided body part weighing units comprising portions of a trunk body region in the face-up position or any other given position; and a measurement controlling and data processing unit connected to and configured to control the first and second divided body part weighing units and to process first measured data of regional weight of a body received from the first divided body part weighing units and second measured data of portioned weight of the another body region received from the second divided body part weighing units;

wherein the first divided body part weighing units are configured to be controlled by the measurement controlling and data processing unit to separately weigh the head, the right arm, the left arm, the right leg, and the left leg continuously at regular intervals and to transmit the first measured data of regional weight of body to the measurement controlling and data processing unit;

wherein the-second divided body part weighing units are configured to be controlled by the measurement controlling and data processing unit to separately weigh the portions of the another body region continuously at the regular intervals and to transmit the second measured data of portioned weight of the another body region to the measurement controlling and data processing unit;

wherein the measurement controlling and data processing unit is configured to receive the first measured data of regional weight of body from the first divided body part weighing units;

receive the second measured data of portioned weight of the another body region from the second divided body part weighing units;

store the received first measured data of regional weight of body in a memory in association with a measurement time by the respective body regions;

store the received second measured data of portioned weight of the another body region in the memory in association with the measurement time by the respective portions of the another body region;

calculate an average total weight of body of the whole body from the first measured data of regional weight of body and the second measured data of portioned weight of the another body region within a specified period of time stored in the memory;

calculate a difference between total weight of body of the whole body in a standing position measured before or after the specified period of time or based on an average of the total weight of body in the standing position measured before and after the specified period of time and the average total weight of body of the whole body;

determine if the difference does not exceed a predefined value;

define fluctuations indicated in the first measured data of regional weight of body within the specified period of time as fluctuations in respective regional weight of body;

define weight indicated in the first measured data of regional weight of body as respective regional weight of body;

define an average of the fluctuations indicated in the first measured data of regional weight of body within the specified period of time as respective average regional weight of body when the difference does not exceed the predefined value;

store in the memory the defined respective regional weight of body and the defined respective average regional weight of body;

define fluctuations indicated in the second measured data of portioned weight of the another body region within the specified period of time as fluctuations in respective portioned weight of the another body region;

define weight indicated in the second measured data of portioned weight of the another body region as respective portioned weight of the another body region;

define an average of the fluctuations indicated in the second measured data of portioned weight of the another body region within the specified period of time as respective average portioned weight of the another body region when the difference does not exceed the predefined value;

store in the memory the defined respective portioned weight of the another body region and the defined respective average portioned weight of the another body region;

extract the defined respective portioned weight of the another body region from the memory; and output the extracted respective portioned weight of the another body region separately in order of measurement time.

2. A measurement method which measures fluctuations in weight of respective divided body parts comprising:

operating first divided body part weighing units for separately weighing respective body regions and second divided body part weighing units for separately weighing respective portions of another body region, the respective body regions and the another body region being divided from a whole body, the first and second body part weighing units collectively weighing the whole body, the respective body regions separately weighed by the first divided body part weighing units including a head, a right arm, a left arm, a right leg, and a left leg in a face-up position or any other given position, the respective portions of the another body region of separately weighed by the second divided body part weighing units comprising portions of a trunk body region in the face-up position or any other given position;

operating a measurement controlling and data processing unit connected to and configured to control the first and second divided body part weighing units and to process first measured data of regional weight of body received from the first divided body part weighing units and second measured data of portioned weight of the another body region received from the second divided body part weighing units, wherein the first divided body part weighing units are configured to be controlled by the measurement controlling and data processing unit to separately weigh the head, the right arm, the left arm, the right leg, and the left leg continuously at regular intervals and to transmit the first measured data of regional weight of body to the measurement controlling and data processing unit, and wherein the second divided body part weighing units are configured to be controlled by the measurement controlling and data processing unit to separately weigh the portions of the another body region continuously at the regular intervals and to transmit the second measured data of portioned weight of the another body region to the measurement controlling and data processing unit;

receiving the first measured data of regional weight of body from the first divided body part weighing units;

receiving the second measured data of portioned weight of the another body region from the second divided body part weighing units;

storing the received first measured data of regional weight of body in a memory in association with a measurement time by the respective body regions;

storing the received second measured data of portioned weight of the another body region in the memory in association with the measurement time by the respective portions of the another body region;

calculating an average total weight of body of the whole body from the first measured data of regional weight of body and the second measured data of portioned weight of the another body region within a specified period of time stored in the memory;

calculating a difference between total weight of body of the whole body in a standing position measured before or after the specified period of time or based on an average of the total weight of body in the standing position measured before and after the specified period of time and the average total weight of body of the whole body;

determining if the difference does not exceed a predefined value;

defining fluctuations indicated in the first measured data of regional weight of body within the specified period of time as fluctuations in respective regional weight of body;

defining weight indicated in the first measured data of regional weight of body as respective regional weight of body;

defining an average of the fluctuations indicated in the first measured data of regional weight of body within the specified period of time as respective average regional weight of body when the difference does not exceed the predefined value;

storing in the memory the defined respective regional weight of body and the defined respective average regional weight of body;

defining fluctuations indicated in the second measured data of portioned weight of the another body region within the specified period of time as fluctuations in respective portioned weight of the another body region;

defining weight indicated in the second measured data of portioned weight of the another body region as respective portioned weight of the another body region;

defining an average of the fluctuations indicated in the second measured data of portioned weight of the another body region within the specified period of time as respective average portioned weight of the another body region when the difference does not exceed the predefined value;

storing in the memory the defined respective portioned weight of the another body region and the defined respective average portioned weight of the another body region;

extracting the defined respective portioned weight of the another body region from the memory; and outputting the extracted respective portioned weight of the another body region separately in order of measurement time.

* * * * *